United States Patent
Zhou et al.

(10) Patent No.: US 11,641,229 B2
(45) Date of Patent: *May 2, 2023

(54) BEAM SWITCH RELATED INFORMATION FEEDBACK IN WIRELESS COMMUNICATIONS

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,913

(22) Filed: Oct. 4, 2021

(65) Prior Publication Data

US 2022/0029680 A1 Jan. 27, 2022

Related U.S. Application Data

(63) Continuation of application No. 16/721,499, filed on Dec. 19, 2019, now Pat. No. 11,152,992.

(60) Provisional application No. 62/784,339, filed on Dec. 21, 2018.

(51) Int. Cl.
  *H04B 7/06* (2006.01)
(52) U.S. Cl.
  CPC ......... *H04B 7/0619* (2013.01); *H04B 7/0617* (2013.01)

(58) Field of Classification Search
  CPC .......................... H04B 7/0619; H04B 7/0617
  USPC ....................................................... 375/267
  See application file for complete search history.

(56) References Cited

U.S. PATENT DOCUMENTS

| 11,152,992 B2* | 10/2021 | Zhou ................. H04B 7/063 |
| 2010/0127931 A1* | 5/2010 | Rensburg ............. H04B 7/026 342/372 |
| 2015/0092846 A1 | 4/2015 | Lu et al. |
| 2015/0156708 A1 | 6/2015 | Tietz et al. |
| 2018/0262918 A1* | 9/2018 | Zhao ................... H04B 7/0482 |

(Continued)

OTHER PUBLICATIONS

"Beam Management", 3GPP Draft, R2-164898, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, 28160822-20160826, Aug. 12, 2016 (Aug. 12, 2016), XP051142723, 2 pages, Retrieved from the Internet: URL: http://www.3gpp.org/ftp/tsg_ran/WG2_RL2/TSGR2_95/Docs/. [retrieved on Aug. 12, 2016] 2.3 Beam Management 2.5 UE Side Beamforming figures 1'3 Proposals 1-3.

(Continued)

*Primary Examiner* — Kevin M Burd

(57) ABSTRACT

Methods, systems, and devices for wireless communications are described in which measurements of a number of beams that are transmitted from a first device, measured at a second device are provided in a beam switch metric report from the second device. The beam switch metric report may provide the first device with information that is otherwise unavailable to the first device and that may be used for setting beam management parameters.

10 Claims, 19 Drawing Sheets

(56) References Cited

U.S. PATENT DOCUMENTS

2020/0100290 A1     3/2020     Mundarath et al.
2020/0204237 A1     6/2020     Zhou et al.

OTHER PUBLICATIONS

International Search Report and Written Opinion—PCT/US2019/067799—ISA/EPO—dated Mar. 24, 2020.

Nokia., et al., "Remaining Issues on Beam Management", 3GPP Draft, R1-1805104, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. Ran WG1, No. Sanya, P. R. China, Apr. 16, 2018- Apr. 20, 2018, Apr. 15, 2018 (Apr. 15, 2018), XP051427363, 7 pages, Retrieved from the Internet: URL: http://www.3gpp.org/ftp/Meetings%5F3GPP%5FSYNC/RAN1/Docs/, [retrieved on Apr. 15, 2018] 4.2 Baseline solution 4.3 Solution for enhanced power saving possibilities 5.2 On Potential Impact on Beam Management, p. 1, 2 Default TCI State, pp. 1-4,3 PUSCH Beamindication, p. 12, 7.3.1.1.2 Format 0_1.

Samsung: "On Beam Management, Measurement and Reporting", 3GPP Draft, 3GPP TSG RAN WG1 Meeting 90bis, R1-1717605_V6, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017,Oct. 8, 2017 (Oct. 8, 2017), XP051340791, 16 Pages, Retrieved from the Internet: URL:http://www.3gpp.org/ftp/Meetings_3GPP_SYNC/RAN1/Docs/ [retrieved on Oct. 8, 2017].

Zte., "Discussion on Beam Switching Speed for NR BS", 3GPP Draft, R4-1707964, 3rd Generation Partnership Project (3GPP), Mobile Competence Centre, 650, Route Des Lucioles, F-06921 Sophia-Antipolis Cedex, France, vol. RAN WG4, No. Berlin, Germany, Aug. 21, 2017-Aug. 25, 2017, Aug. 20, 2017 (Aug. 20, 2017), XPG51321137, 3 pages, Retrieved from the Internet: URL: http://www.3gpp.org/ftp/Meetings_3GPP_SYNC/RAN4/Docs/. [retrieved on Aug. 20, 2017], 1. Introduction 2. Discussion Proposal 1 Observation 1.

\* cited by examiner

BEAM SWITCH RELATED INFORMATION FEEDBACK IN WIRELESS COMMUNICATIONS

CLAIM OF PRIORITY UNDER 35 U.S.C. § 120

The present application for patent is a continuation of U.S. Non-Provisional application Ser. No. 16/721,499 by ZHOU, et al., entitled "BEAM SWITCH RELATED INFORMATION FEEDBACK IN WIRELESS COMMUNICATIONS," filed Dec. 19, 2019, which claims priority to U.S. Provisional Application No. 62/784,339 by ZHOU, et al., entitled "BEAM SWITCH RELATED INFORMATION FEEDBACK IN WIRELESS COMMUNICATIONS," filed Dec. 21, 2018, each of which is assigned to the assignee of the present application and hereby expressly incorporated by reference herein in its entirety.

BACKGROUND

The following relates generally to wireless communications, and more specifically to beam switch related information feedback in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless multiple-access communications systems may include a number of transmission/reception points (TRPs), such as base stations, network access nodes, or UEs (e.g., in a peer-to-peer or device-to-device deployment), each simultaneously supporting communication for multiple UEs or other network devices. In some wireless communications systems, a wireless devices (such as a base station and UE) may communicate using directional beams (e.g., directional transmit beams and directional receive beams) that form beam pair links (BPLs) for exchanging data packets. In some cases, the wireless devices may modify one or more BPLs used to communicate, for example, due to the mobility of one or both of the devices resulting in a change in a preferred directional transmit beam or directional receive beam. However, conventional techniques for dynamically managing beams may be deficient.

SUMMARY

The described techniques relate to improved methods, systems, devices, and apparatuses that support beam switch related information feedback in wireless communications. Various described techniques provide for measurements of a number of beams that are transmitted from a first device (e.g., a base station) at a second device (e.g., a user equipment (UE)), and transmission of a beam switch metric report from the second device. The beam switch metric report may provide the first device with information that is otherwise unavailable to the first device and that may be used for setting beam management parameters, such as resources for reference signal transmissions, beam directions and periodicity of changes of preferred transmission beams, for example. In some cases, the second device may provide the beam switch metric report to a third device (e.g., a master base station) which may identify beam refinement parameters and initial access resources (e.g., random access resources) for initiating a connection between the second device and the third device (e.g., a secondary base station). In some cases, the second device may perform measurements using a number of different receive beams at the second device, and the beam switch metrics may provide information associated with a beam switch periodicity for switching the second device between two or more of the of receive beams.

A method of wireless communication at a device including is described. The method may include identifying a set of beams associated with a first device, each of the set of beams of the first device having a different direction relative to the first device, determining, based on the set of beams of the first device, one or more beam switch metrics associated with a beam switch periodicity for switching a second device between two or more of the set of beams of the first device, and transmitting a report to the first device or a third device that indicates the one or more beam switch metrics.

An apparatus for wireless communication at a device including is described. The apparatus may include a processor, memory in electronic communication with the processor, and instructions stored in the memory. The instructions may be executable by the processor to cause the apparatus to identify a set of beams associated with a first device, each of the set of beams of the first device having a different direction relative to the first device, determine, based on the set of beams of the first device, one or more beam switch metrics associated with a beam switch periodicity for switching a second device between two or more of the set of beams of the first device, and transmit a report to the first device or a third device that indicates the one or more beam switch metrics.

Another apparatus for wireless communication at a device including is described. The apparatus may include means for identifying a set of beams associated with a first device, each of the set of beams of the first device having a different direction relative to the first device, determining, based on the set of beams of the first device, one or more beam switch metrics associated with a beam switch periodicity for switching a second device between two or more of the set of beams of the first device, and transmitting a report to the first device or a third device that indicates the one or more beam switch metrics.

A non-transitory computer-readable medium storing code for wireless communication at a device including is described. The code may include instructions executable by a processor to identify a set of beams associated with a first device, each of the set of beams of the first device having a different direction relative to the first device, determine, based on the set of beams of the first device, one or more beam switch metrics associated with a beam switch periodicity for switching a second device between two or more of the set of beams of the first device, and transmit a report to the first device or a third device that indicates the one or more beam switch metrics.

In some examples of the method, apparatuses, and non-transitory computer-readable medium described herein, the first device and the third device may each be base stations, and the second device may be a UE. In some examples of the method, apparatuses, and non-transitory computer-readable medium described herein, the one or more beam switch metrics provide information for setting beam management transmissions in accordance with the beam switch periodicity for switching the second device between the two or more of the set of beams of the first device.

In some examples of the method, apparatuses, and non-transitory computer-readable medium described herein, the report may be transmitted to the third device, and the one or more beam switch metrics provide information for selecting a first transmission beam for transmitting an initial access request to the first device. Some examples of the method, apparatuses, and non-transitory computer-readable medium described herein may further include operations, features, means, or instructions for identifying a first time at which a first synchronization signal block (SSB) transmission of the first device that has more favorable channel conditions than one or more other SSB transmissions of the first device, identifying a second time at which a second SSB transmission of the first device has more favorable channel conditions than the first SSB transmission and one or more other of the SSB transmissions of the first device, and providing at least the first time and the second time to the third device in a best SSB time trace (BST) beam switch metric.

Some examples of the method, apparatuses, and non-transitory computer-readable medium described herein may further include operations, features, means, or instructions for receiving a control information transmission from the third device that indicates the second device is to transmit the initial access request to the first device, and that indicates one or more SSB transmissions of the first device that are to be monitored for reference signal transmissions to determine a preferred transmission beam for subsequent communications with the first device.

Some examples of the method, apparatuses, and non-transitory computer-readable medium described herein may further include operations, features, means, or instructions for determining, based on one or more of the beam switch metrics, the beam switch periodicity, where the beam switch periodicity indicates a rate at which transmission beams having more favorable transmission beam channel conditions than other of the set of transmission beams changes at the second device, and transmitting the determined beam switch periodicity to the first device or the second device.

In some examples of the method, apparatuses, and non-transitory computer-readable medium described herein, the beam metrics may include one or more of a speed of the second device, a Doppler shift of one or more transmission beams observed at the second device, a distance between the second device and the first device, a dwelling time that indicates an expected time duration during which a transmission beam will may have more favorable channel conditions than any other of the set of transmission beams of the first device, a dwelling time that indicates an expected time duration during which a receive beam of the second device will provide more favorable receive conditions than any of a set of other receive beams of the second device, a time trace of consecutive transmission beams having a highest quality at the second device for a prior time period, a second device movement profile that includes information related to the second device movement speed and direction, spatial location changes, a calculated beam switch periodicity, or any combinations thereof. In some examples of the method, apparatuses, and non-transitory computer-readable medium described herein, the quality includes one or more of a received signal strength or signal to interference and noise ratio (SINR).

In some examples of the method, apparatuses, and non-transitory computer-readable medium described herein, the beam switch metrics may include statistics that include one or more of an average value of the associated beam switch metric, a median value of the associated beam switch metric, a percentile of the associated beam switch metric, a maximum value of the associated beam switch metric during a predetermined time period, a minimum value of the associated beam switch metric during the predetermined time period, a histogram of observed beam switch metrics for the predetermined time period, or any combinations thereof.

Some examples of the method, apparatuses, and non-transitory computer-readable medium described herein may further include operations, features, means, or instructions for determining to transmit the report based on a change in one or more of the beam switch metrics exceeding a threshold value. In some examples of the method, apparatuses, and non-transitory computer-readable medium described herein, the report may be transmitted autonomously by the second device. Some examples of the method, apparatuses, and non-transitory computer-readable medium described herein may further include operations, features, means, or instructions for receiving configuration information from the first device that indicates a periodicity for transmitting the report, and transmitting the report according to the periodicity for transmitting the report. In some examples of the method, apparatuses, and non-transitory computer-readable medium described herein, the report may be transmitted in a medium access control (MAC) control element (CE). In some examples of the method, apparatuses, and non-transitory computer-readable medium described herein, the report further includes a cell identification associated with the one or more beam switch metrics.

Some examples of the method, apparatuses, and non-transitory computer-readable medium described herein may further include operations, features, means, or instructions for identifying a set of cells for which beam switch metrics are measurable, determining that at least one cell of the set of cells is a mobile cell and that one or more of the set of cells are stationary cells, and measuring the beam switch metrics of the one or more stationary cells.

A method of wireless communication at a second device including is described. The method may include identifying a set of receive beams associated with the second device, each of the set of receive beams of the second device having a different direction relative to the second device, determining, based on the set of receive beams of the second device, one or more beam switch metrics associated with a beam switch periodicity for switching the second device between two or more of the set of receive beams, and transmitting a report to a first device or a third device that indicates the one or more beam switch metrics.

An apparatus for wireless communication at a second device including is described. The apparatus may include a processor, memory in electronic communication with the processor, and instructions stored in the memory. The instructions may be executable by the processor to cause the apparatus to identify a set of receive beams associated with the second device, each of the set of receive beams of the second device having a different direction relative to the second device, determine, based on the set of receive beams of the second device, one or more beam switch metrics associated with a beam switch periodicity for switching the second device between two or more of the set of receive beams, and transmit a report to a first device or a third device that indicates the one or more beam switch metrics.

Another apparatus for wireless communication at a second device including is described. The apparatus may include means for identifying a set of receive beams associated with the second device, each of the set of receive beams of the second device having a different direction relative to the second device, determining, based on the set of receive beams of the second device, one or more beam switch metrics associated with a beam switch periodicity for switching the second device between two or more of the set of receive beams, and transmitting a report to a first device or a third device that indicates the one or more beam switch metrics.

A non-transitory computer-readable medium storing code for wireless communication at a second device including is described. The code may include instructions executable by a processor to identify a set of receive beams associated with the second device, each of the set of receive beams of the second device having a different direction relative to the second device, determine, based on the set of receive beams of the second device, one or more beam switch metrics associated with a beam switch periodicity for switching the second device between two or more of the set of receive beams, and transmit a report to a first device or a third device that indicates the one or more beam switch metrics.

In some examples of the method, apparatuses, and non-transitory computer-readable medium described herein, the first device and the third device are each base stations, and the second device is a UE. In some examples of the method, apparatuses, and non-transitory computer-readable medium described herein, the one or more beam switch metrics provide information for setting beam management transmissions in accordance with the beam switch periodicity for switching the second device between the two or more of the set of receive beams of the second device.

In some examples of the method, apparatuses, and non-transitory computer-readable medium described herein, the one or more beam switch metrics include one or more of a speed of the second device, a Doppler shift of one or more transmission beams observed at the second device, a distance between the second device and the first device, a dwelling time that indicates an expected time duration during which a transmission beam of the first device will may have more favorable channel conditions than any other of a set of transmission beams of the first device, a dwelling time that indicates an expected time duration during which a receive beam of the second device will provide more favorable receive conditions than any other of the set of receive beams of the second device, a second device movement profile that includes information related to the second device movement speed and direction, spatial location changes, a calculated beam switch periodicity, or any combinations thereof.

In some examples of the method, apparatuses, and non-transitory computer-readable medium described herein, the one or more beam switch metrics include statistics for one or more of an average value of the associated beam switch metric, a median value of the associated beam switch metric, a percentile of the associated beam switch metric, a maximum value of the associated beam switch metric during a predetermined time period, a minimum value of the associated beam switch metric during the predetermined time period, a histogram of observed beam switch metrics for the predetermined time period, or any combinations thereof.

A method of wireless communication at a first device is described. The method may include establishing a connection with a second device, receiving, from the second device, a report that indicates one or more beam switch metrics associated with a set of transmission beams received at the second device, determining, based on the report, one or more beam management parameters for one or more transmissions to the second device via one or more of the set of transmission beams, and transmitting the one or more beam management parameters to the second device.

An apparatus for wireless communication at a first device is described. The apparatus may include a processor, memory in electronic communication with the processor, and instructions stored in the memory. The instructions may be executable by the processor to cause the apparatus to establish a connection with a second device, receive, from the second device, a report that indicates one or more beam switch metrics associated with a set of transmission beams received at the second device, determine, based on the report, one or more beam management parameters for one or more transmissions to the second device via one or more of the set of transmission beams, and transmit the one or more beam management parameters to the second device.

Another apparatus for wireless communication at a first device is described. The apparatus may include means for establishing a connection with a second device, receiving, from the second device, a report that indicates one or more beam switch metrics associated with a set of transmission beams received at the second device, determining, based on the report, one or more beam management parameters for one or more transmissions to the second device via one or more of the set of transmission beams, and transmitting the one or more beam management parameters to the second device.

A non-transitory computer-readable medium storing code for wireless communication at a first device is described. The code may include instructions executable by a processor to establish a connection with a second device, receive, from the second device, a report that indicates one or more beam switch metrics associated with a set of transmission beams received at the second device, determine, based on the report, one or more beam management parameters for one or more transmissions to the second device via one or more of the set of transmission beams, and transmit the one or more beam management parameters to the second device.

In some examples of the method, apparatuses, and non-transitory computer-readable medium described herein, the first device is a base station, and the second device is a UE.

In some examples of the method, apparatuses, and non-transitory computer-readable medium described herein, the one or more beam management parameters include a beam switch periodicity for switching the second device between two or more of the set of transmission beams. In some examples of the method, apparatuses, and non-transitory computer-readable medium described herein, the first device may be a primary base station in a non-stand-alone (NSA) deployment, and the set of transmission beams may be transmitted by a secondary base station in the NSA deployment, and where the methods, apparatuses, and non-transitory computer-readable medium described herein further may include operations, features, means, or instructions for identifying, by the first device based on the one or more beam switch metrics, a first transmission beam of the set of transmission beams for the second device to transmit an initial access request to the secondary base station.

In some examples of the method, apparatuses, and non-transitory computer-readable medium described herein, at least a subset of the set of transmission beams include a synchronization signal block (SSB) transmission from the secondary base station, and where the report includes a best SSB time trace (BST) beam switch metric that indicates two or more time periods and, for each of the two or more time periods, a preferred SSB of the second device.

Some examples of the method, apparatuses, and non-transitory computer-readable medium described herein may further include operations, features, means, or instructions for providing the secondary base station with the BST beam switch metric received from the second device, and transmitting to the second device, based on the BST beam switch metric, control information for the second device monitor one or more SSB transmissions and to transmit the initial access request.

Some examples of the method, apparatuses, and non-transitory computer-readable medium described herein may further include operations, features, means, or instructions for determining, based on one or more of the beam switch metrics, a beam switch periodicity of the second device that indicates a rate at which transmission beams having more favorable transmission beam channel conditions than other of the set of transmission beams changes at the second device, and where the one or more beam management parameters may be based on the beam switch periodicity.

In some examples of the method, apparatuses, and non-transitory computer-readable medium described herein, the one or more of the beam switch metrics include one or more of a speed of the second device, a Doppler shift of one or more transmission beams observed at the second device, a distance between the second device and the first device, a dwelling time that indicates an expected time duration during which a transmission beam will may have more favorable channel conditions at the second device than any other of the set of transmission beams, a dwelling time that indicates an expected time duration during which a receive beam of the second device will provide more favorable receive conditions than any of a set of other receive beams of the second device, a time trace of consecutive transmission beams having a highest received power at the second device for a prior time period, a second device movement profile that includes information related to the second device movement speed and direction, spatial location changes, a calculated beam switch periodicity, or any combinations thereof.

In some examples of the method, apparatuses, and non-transitory computer-readable medium described herein, one or more of the beam switch metrics may include statistics that include one or more of an average value of the associated beam switch metric, a median value of the associated beam switch metric, a percentile of the associated beam switch metric, a maximum value of the associated beam switch metric during a predetermined time period, a minimum value of the associated beam switch metric during the predetermined time period, a histogram of observed beam switch metrics for the predetermined time period, or any combinations thereof.

Some examples of the method, apparatuses, and non-transitory computer-readable medium described herein may further include operations, features, means, or instructions for configuring the second device to transmit the report based on a change in one or more of the beam switch metrics exceeding a threshold value. In some examples of the method, apparatuses, and non-transitory computer-readable medium described herein, the report may be transmitted autonomously by the second device. Some examples of the method, apparatuses, and non-transitory computer-readable medium described herein may further include operations, features, means, or instructions for configuring the second device to transmit the report according to a periodic transmission schedule, and monitoring for the report from the second device according to the periodic transmission schedule. In some examples of the method, apparatuses, and non-transitory computer-readable medium described herein, the report may be received in a MAC-CE from the second device. In some examples of the method, apparatuses, and non-transitory computer-readable medium described herein, the report further includes a cell identification associated with the one or more beam switch metrics.

DETAILED DESCRIPTION

Figure 1:
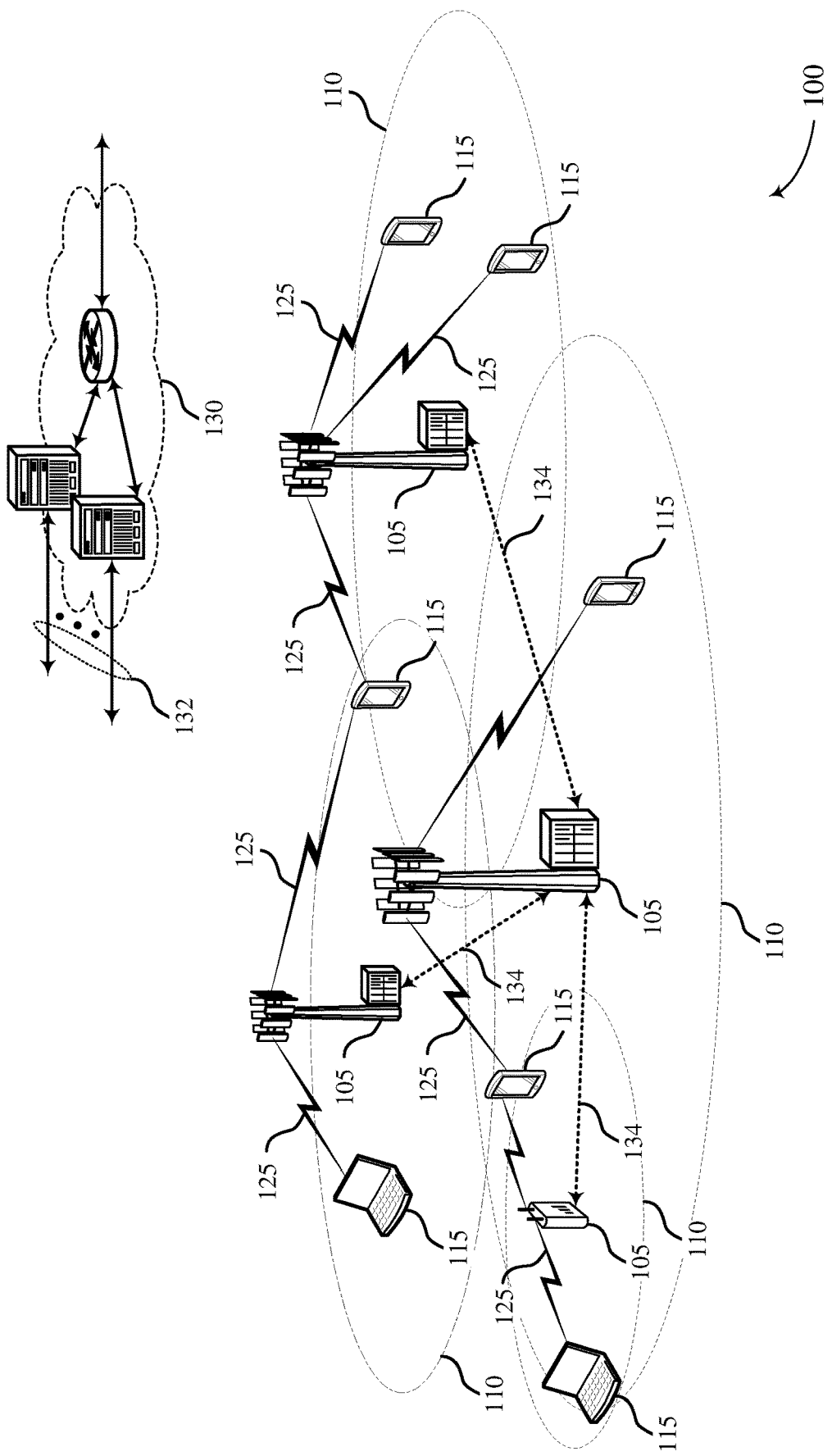
FIG. 1 illustrates an example of a system for wireless communications that supports beam switch related information feedback in wireless communications in accordance with aspects of the present disclosure.

Some wireless communication systems may operate in millimeter wave (mmW) frequency ranges, e.g., 25 gigahertz (GHz), 40 GHz, 60 GHz, etc. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via directional beams (e.g., beamformed for transmission and reception using an antenna array at the wireless device). For example, two or more wireless devices may communicate via beam pair links (BPLs), where each BPL includes a transmit beam of one wireless device (e.g., a user equipment (UE)) and a receive beam of another wireless device (e.g., a base station, another UE, a transmission/reception point (TRP), etc.).

Systems that employ transmission beams may use measurements related to multiple beams to identify a best, or most preferred beam to use in a BPL. For example, a first wireless device (e.g., a base station) may perform a beam sweep (e.g., a P1 beam training procedure) in which consecutive beams having a relatively wide beam width are transmitted and may be measured at a second wireless device (e.g., a UE) to identify a best beam (e.g., a beam with a highest reference signal received power (RSRP)) and provide an indication to the first wireless device of the preferred beam. In some cases, further beam refinements may be performed in which the first wireless device may transmit one or more reference signals (e.g., a channel state information (CSI) reference signal (CSI-RS) in a P2/P3 beam training procedure) in narrower beams to identify more focused beams for use in BPLs.

Various aspects of the present disclosure provide that a second wireless device (e.g., a UE, a TRP, etc.) may measure one or more beams of a first wireless device (e.g., another UE, a base station, a TRP, etc.), identify one or more other parameters associated with the second wireless device (e.g., speed, a movement profile, etc.), and determine one or more beam metrics. Such beam metrics may be provided to the first wireless device or another wireless device, and may be used to determine beam management parameters for beams in which to include reference signal transmissions, periodicity of such reference signal transmissions, and the like.

Such techniques may allow for enhanced beam management operations based on beam metrics that are provided by the second wireless device, and that may not be directly observable by the first wireless device or other wireless device that may perform beam management operations. For example, the first wireless device may be a base station that establishes an initial connection with the second wireless device which may be a UE. In such cases, the base station may need to configure beam management periodicity for newly connected UE after initial access, or handover from another base station. However, base station may not have any information related to, for example, how fast the UE may need to switch beams (e.g., whether the UE is stationary, is travelling at a relatively high speed, is rotating with respect to the base station, etc.). In such cases, the report of beam metrics provided to the base station may allow the base station to provide beam management periodicity that supports a beam switch periodicity of the UE.

In other cases, the base station may need to increase beam management periodicity for an existing UE whose speed suddenly increases. However, the base station is not able to directly detect the UE speed increase quickly if a current beam management periodicity is slow (e.g., when the UE changes from a stationary state to a moving state). In such cases, beam metric reporting provided by the UE in accordance with techniques provided herein may allow the base station to more quickly adapt the beam management periodicity so beam switching can be performed.

Further, in some cases wireless devices may be deployed in an internet-of-things (IoT) deployment such as an industrial IoT in which the devices may be associated with industrial equipment. In such cases, a first wireless device (e.g., a controller, base station, etc.) may receive beam metric reports from a second wireless device (e.g., a UE having an associated sensor, a robot arm, etc.). For example, a controller may wirelessly communicate with motion control sensors on different moving machines using beamformed communications. However, the controller may not be aware of the movement/rotation speed per sensor. In some cases, each sensor may can feed back its movement profile to the controller in accordance with techniques as discussed herein to enhance periodicity for beam management (e.g., enhance periodicity for a number of beam management phases, such as P1/P2/P3 beam training and refinement procedures).

In other cases, a first wireless device may provide a master node or anchor connection to a second wireless device, and a third wireless device may use beamformed communications for a secondary connection with the second wireless device. Such a deployment may be referred to as a non-stand-alone (NSA) mode, and the third wireless device may perform a beam sweep in which a number of synchronization signal blocks (SSBs) are transmitted in successive beams. In some cases, the second device, when performing initial access with the third wireless device, may provide a report to the first wireless device that initiates access with the third wireless device. The first wireless device may use the report to configure random access channel (RACH) resources for an initial access transmission (e.g., a RACH message 1 (MSG1) transmission). However, if the second wireless device is moving relatively fast, or rotating relatively fast, a best beam at the second wireless device may have changed during a time between the report and configuration of the initial access resources. Using techniques as discussed herein, the second wireless device may provide a beam metric report that can feed back a time trace of the best beams observed at the UE to the first wireless device, and which may be used to provide initial access resources with a higher likelihood of successful communications.

Aspects of the disclosure are initially described in the context of a wireless communications system. Further examples are then provided which illustrate beam metric measurements are reporting, and the modification of communications between devices using different BPLs and robust communications schemes. Aspects of the disclosure are further illustrated by and described with reference to apparatus diagrams, system diagrams, and flowcharts that relate to beam switch related information feedback in wireless communications.

FIG. 1 illustrates an example of a wireless communications system 100 that supports beam switch related information feedback in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of beam metric reports from UEs 115 (or other wireless devices) that use BPLs that may allow for beam management periodicity to be adjusted in response to dynamically changing conditions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

A base station 105 may transmit synchronization signal (SS) sequences to multiple UEs 115, and a UE 115 may attempt to detect the SS sequences by correlating received SS signals with the SS sequences. In some examples, the SSs may be transmitted by the base station 105 using one or more SSBs (e.g., time-frequency resources used for the transmission of SSs). For example, PSS, SSS, and/or broadcast information (e.g., a physical broadcast channel (PBCH)) may be transmitted within different SSBs on respective directional beams or on different time/frequency resources. In some cases, one or more SSBs may be included within an SS burst. Additionally, SSBs may be quasi-co located (QCL'ed) with other signals transmitted within wireless communications system 100.

A UE 115 may be configured with one or more transmission configuration indicator (TCI) state configurations. Different TCI states, distinguished by different values of the TCI, may correspond to quasi co-location (QCL) relationships with different reference signal transmissions. For example, each TCI state may be associated with one of the previously received reference signals. The TCI state may provide a spatial QCL reference that the UE 115 can use to set the receive beam. By configuring the TCI states at the UE 115, the base station 105 can dynamically select beams for downlink transmission to the UE 115, and the UE 115 can select the corresponding receive beam to receive the downlink transmission. For a downlink transmission, the base station 105 may transmit an indication of the TCI state to the UE 115, and the UE 115 may select the corresponding receive beam based on the indicated TCI state to receive the downlink transmission. The TCI states may be configured via higher layer signaling.

Wireless communications system 100 may support beam switch metric reporting techniques that provide for measurements of a number of beams that are transmitted from a first device (e.g., a controlling wireless device, which may be an example of a base station 105, a TRP, a UE 115, a motion controller, etc.) at a second device (e.g., a secondary wireless device, which may be an example of a UE 115). The beam switch metric reporting may provide the first device with information that is otherwise unavailable to the first device and that may be used for setting beam management parameters, such as resources for reference signal transmissions, beam directions and periodicity of changes of preferred transmission beams, for example. In some cases, the second device may provide the beam switch metric report to a third device (e.g., a master base station 105) which may identify beam refinement parameters and initial access resources (e.g., random access resources) for initiating a connection between the second device and the third device (e.g., a secondary base station). In some cases, the second device may perform measurements using a number of different receive beams at the second device, and the beam switch metrics may provide information associated with a beam switch periodicity for switching the second device between two or more of the of receive beams.

Figure 2:
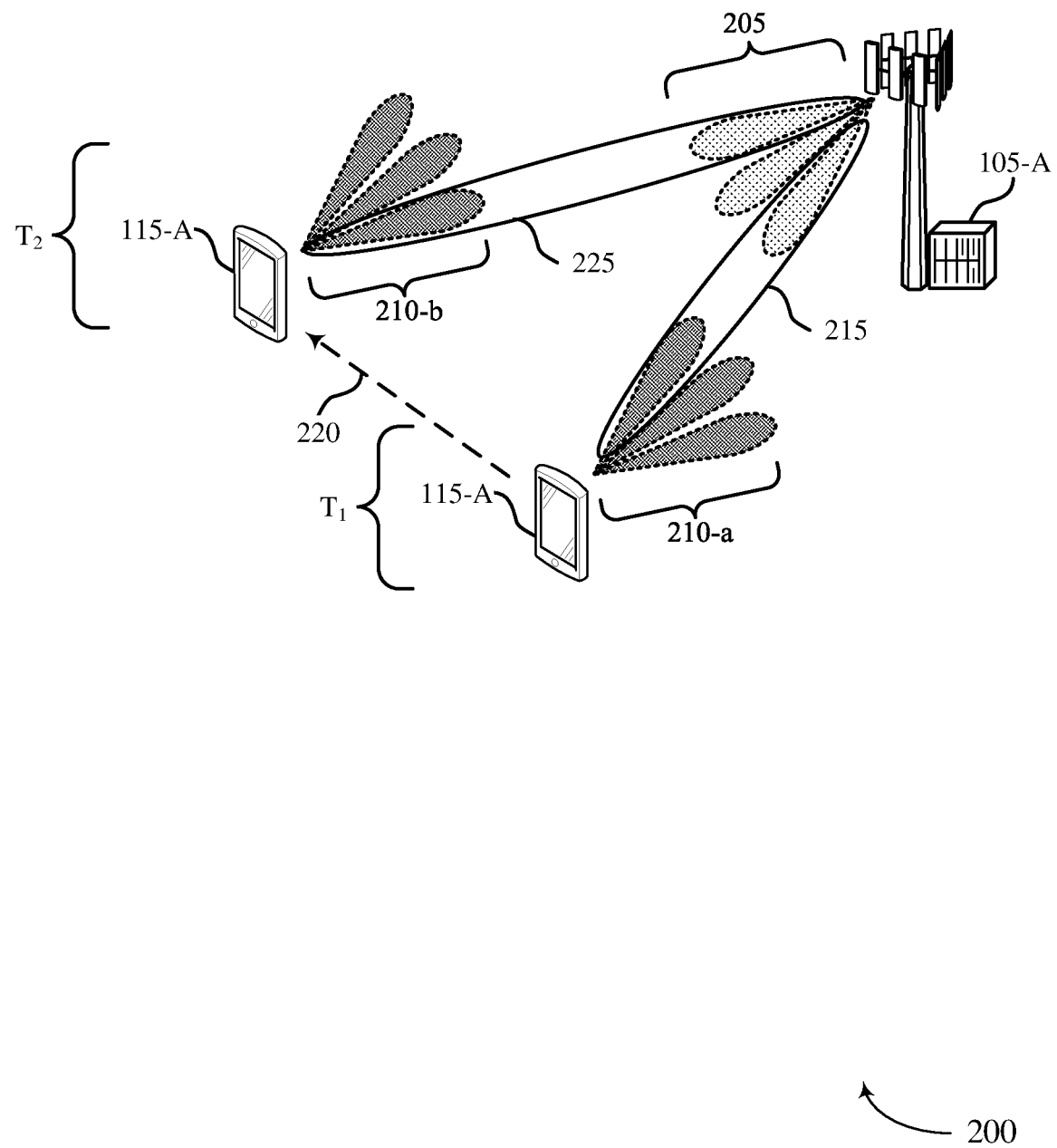
FIG. 2 illustrates an example of a portion of a wireless communications system that supports beam switch related information feedback in wireless communications in accordance with aspects of the present disclosure.

FIG. 2 illustrates an example of a wireless communications system 200 that supports beam switch related information feedback in wireless communications in accordance with aspects of the present disclosure. In some examples, wireless communications system 200 may implement aspects of wireless communications system 100. For example, wireless communications system 200 may include a base station 105-*a* and a UE 115-*a*, which may be examples of the corresponding devices described with reference to FIG. 1.

In wireless communications system 200, base station 105-*a* and UE 115-*a* may communicate using directional beams. For example, base station 105-*a* may use beamforming techniques to form a set of base station beams 205 used for transmitting and receiving wireless signals. Likewise, UE 115-a, at an initial time ($T_1$) may form a set of UE beams 210-a for transmitting and receiving wireless signals. In some cases, UE 115-a and base station 105-a may perform procedures to identify one or more beams that provide a highest signal or link quality (e.g., compared to other beams within a set of base station beams 205 and UE beams 210-a), which may include the measurement of one or more reference signals (e.g., CSI-RS, SSBs, etc.) transmitted by base station 105-a. UE 115-a and base station 105-a may each identify one or more pairs of corresponding beams that provide a link to communicate data between the devices. As such, UE 115-a and base station 105-a may establish a communication link using a first beam pair link 215.

As an example of establishing a communication link, the BPL 215 may include a transmission beam formed by the transmitting entity and directional listening implemented by the receiving entity. For example, in downlink communications, base station 105-a may use a phased-array antenna to form a directional transmission beam and UE 115-a may use directional listening. In some cases, a base station beam 205 (e.g., directional listening beam or transmission beam) formed by base station 105-a may be larger than a UE beam 210 (e.g., a transmission beam or direction listening) formed by UE 115-a (e.g., because base station 105-a may have a larger array of antennas to perform beamforming). In uplink communications, the roles of base station 105-a and UE 115-a may be reversed. In some cases, wireless communications system 200 may operate in shared radio frequency band spectrum. As such, wireless communications system 200 may use contention-based protocols to gain access communication resources. In other examples, wireless communications system 200 may operate in licensed radio frequency spectrum bands, where communications may be scheduled by base station 105-a.

UE 115-a and base station 105-a may switch between different BPLs 215, for example, based on the movement and/or location of UE 115-a. For example, the UE 115-a may move, as indicated at 220, to a different location at a later time ($T_2$) and UE beams 210-b and base station beams 205 may result in a second beam pair link 225 providing a better connection for communications. As such, BPL switching performed by UE 115-a and base station 105-a may be performed. However, as indicated above, in cases where the movement of the UE 115-a at time $T_2$ results in a beam switching periodicity that is different that a beam switching periodicity that is established at $T_1$, switching from the first BPL 215 to the second BPL 225 may be performed late, which can degrade performance and reliability of the system. Thus, in accordance with various techniques discussed herein, the UE 115-a may transmit a beam switch metric report to the base station 105-a that may allow for beam management periodicities that are adjusted based on current conditions. Such techniques may provide enhanced beam management performance to allow for efficient and timely beam switching, while also using an appropriate amount of overhead based on current conditions (e.g., CSI-RS resources may be reduced for relatively slow beam switch periodicities and increased for relatively fast beam switch periodicities).

In some cases, the UE 115-a may transmit one or more reports that include beam switch related metrics to the base station 105-a. The base station 105-a may use the beam switch metrics to determine, for example, beam management periodicities (e.g., individual P1/P2/P3 BM periodicity) to save overhead and power consumption, while maintaining good BPL quality. Additionally or alternatively, the base station 105-a may use the beam switch metrics to predict a best SSB beam for initial access of the UE 115-a with a second base station in a NSA mode of operation, as will be discussed in more detail with respect to FIGS. 3 through 5.

In some cases, the beam switch metrics may include one or more of a number of different metrics. For example, a first metric may be provided that includes statistics of speed, Doppler shift, distance between the UE 115-a and base station (105-a), which may be used in some examples to determine P1/P2 periodicity. In some cases, the first metric may also include statistics of angular speed of the UE, and a UE beam width, which may be used in some examples to determine P3 periodicity. In some cases a second metric may include statistics of dwelling time of best base station 105-a beams (e.g., SSB beams for P1/P2 periodicity), statistics of dwelling time of best UE 115-a beams (e.g., for P3 periodicity), or combinations thereof. In some cases, a third metric may include a time trace of best base station 105-a beams (e.g., SSB beams for P1 periodicity, and for best SSB prediction). In some cases, a fourth metric may include a UE 115-a movement profile, which may include statistics on movement/rotation speed and direction, spatial location change range, and the like. In some cases, statistics of the fourth metric may be quantized or classified into different ranges or types and may be signaled by a corresponding profile index/indicator (e.g., for P1/P2/P3 periodicity). In some cases, a fifth metric may include a recommended beam management periodicity that is provided by the UE 115-a (e.g., a recommended P1/P2/P3 periodicity).

In some cases, the UE 115-a may transmit a beam metric report that includes one or more of such metrics in accordance with a configuration provided by the base station 105-a. In some cases, the UE 115-a may transmit a beam metric report when the base station 105-a has insufficient or outdated information on UE 115-a movement. For example, a report may be transmitted before beam management is configured by the base station 105-a (e.g., at initial access, handover, or before normal operation of industrial IoT devices), or when beam switch periodicity should be changed (e.g., if the best SSB changes faster or slower than a configured P1 report period). In some cases, the UE 115-a may autonomously transmit the beam metric report (e.g., in a medium access control (MAC) control element (MAC-CE) that is configured for such a report). In some cases, the base station 105-a may configure the UE 115-a for periodic or event-triggered reports (e.g., when a metric exceeds an associated threshold, such as a speed of the UE changing by more than a threshold percentage during a time period). In some cases, the statistics reported in a beam metric report may include, for a time period, one or more of an average value, a percentile value, a maximum value, a minimum value, a histogram computed in a time window (e.g., X ms before the report), or any combinations thereof. Additionally, in some cases, the beam metric report may include a cell ID for each reported metric, which may enable the base station 105-a to load corresponding cell locations and SSB beam width to better determine beam management periodicity. In some cases, the UE 115-a may only measure stationary cells, and cells may be configured to broadcast a stationary or mobile flag that the UE 115-a may use to distinguish stationary and mobile cells.

In one example, for a periodicity of a beam training procedure to determine a best SSB of the base station 105-a at the UE 115-a (i.e., a P1 periodicity), the UE 115-a may provide a beam metric report that indicates, for a 10° P1 beam, that the UE has a speed of 72 km/h and a distance of 5 meters from the base station 105-b. Thus, a P1 beam dwelling time is 40 ms, which may be used for beam management periodicity determination. In some cases, the UE 115-a or base station 105-a may determine a corresponding P1 periodicity as 4 ms, to detect a P1 transmit beam change with detection latency of less than 10% of the dwelling time.

In another example, for a beam refinement periodicity (i.e., a P2 periodicity), the UE 115-a may provide a beam metric report that indicates, for a 3° P2 beam, that the UE has a speed of 72 km/h and a distance of 5 meters from the base station 105-b. Thus a P2 beam dwelling time is 10 ms which may be used for beam management periodicity determination. In some cases, the UE 115-a or base station 105-a may determine a corresponding P2 periodicity as 1 ms, to detect a P2 transmit beam change with detection latency of less than 10% of the dwelling time.

In a further example, for a UE 115-a receive beam refinement periodicity (i.e., a P3 periodicity), the UE 115-a may provide a beam metric report that indicates that the UE 115-a has 20° receive beam (i.e., 9 beams covering 180°) and rotates at a rate of 360° per second. In such cases, the best receive beam will change after UE rotates 20°, which is corresponds to 56 ms. In some cases, the UE 115-a or base station 105-a may then determine a corresponding P3 periodicity that is at most 5 ms, to quickly detect P3 receive beam changes. The P1 periodicities may correspond to SSB transmission periodicities, and the P3/P3 periodicities may correspond to CSI-RS periodicities.

It is noted that the operations described herein performed by a UE 115 and base station 105 may be respectively performed by a UE 115, a base station 105, or another wireless device, and the examples shown should not be construed as limiting. For instance, the operations shown as performed by base station 105-a may be performed by a UE 115, a TRP, or another wireless device.

Figure 3:
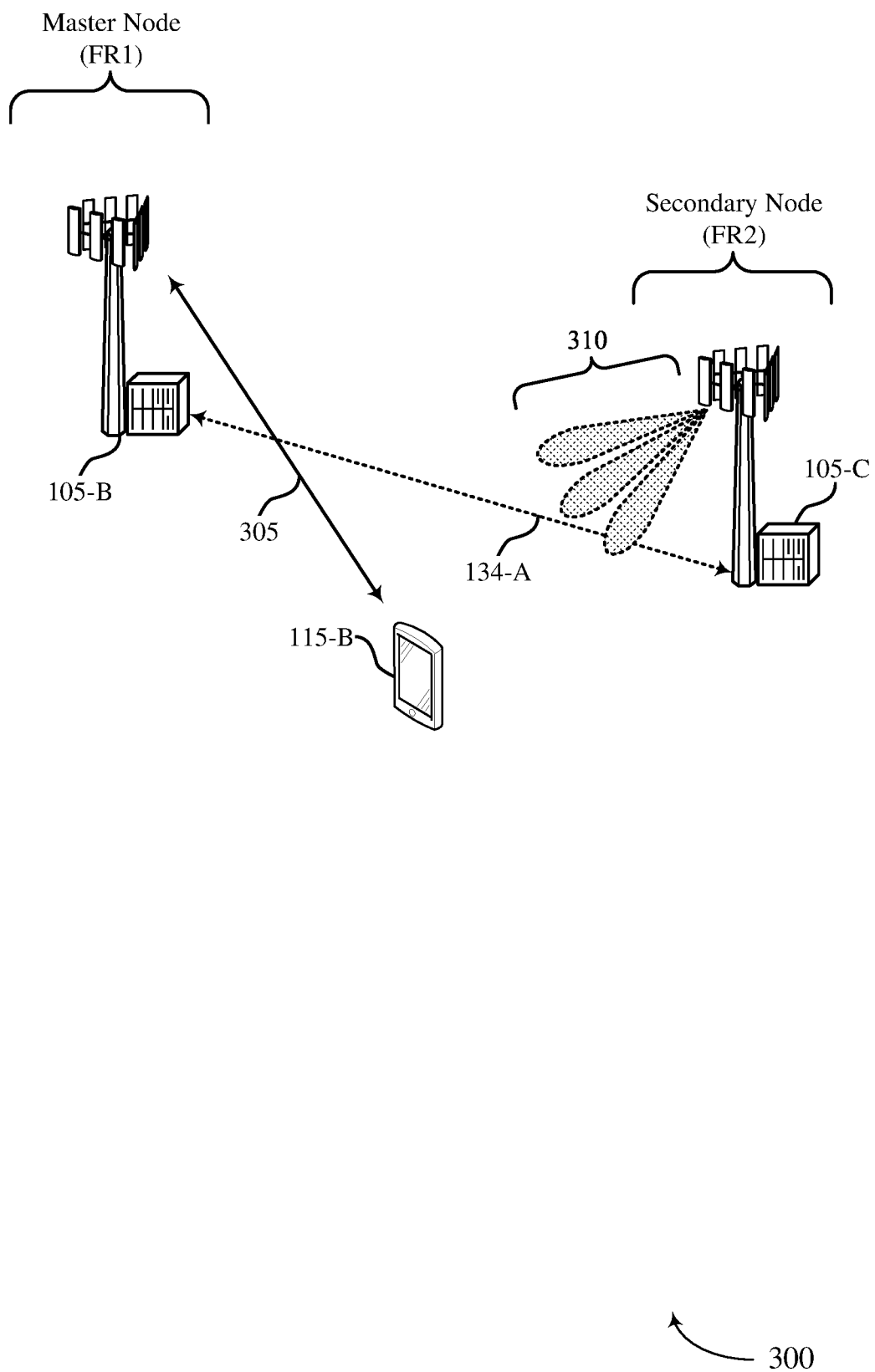
FIG. 3 illustrates an example of a dual connectivity deployment that supports beam switch related information feedback in wireless communications in accordance with aspects of the present disclosure.

FIG. 3 illustrates an example of a dual connectivity NSA deployment 300 that supports beam switch related information feedback in wireless communications in accordance with aspects of the present disclosure. In some examples, dual connectivity deployment 300 may implement aspects of wireless communications system 100 or 200. In this example, a UE 115-b may establish a connection 305 with a first base station 105-b (which may be an example of a first device), which may be a master node operating in a first frequency range (e.g., FR1 or a sub-6 GHz frequency range). The UE 115-b may desire to establish a concurrent connection with a second base station 105-c (which may be an example of a third device, where the UE 115-b is a second device), which may be a secondary node in a NSA deployment that operates in a second frequency range (e.g., FR2 or a millimeter wave frequency range) that uses beamformed communications. The first base station 105-b and the second base station 105-c may be connected via a backhaul link 134-a.

In some cases, the UE 115-b may measure one or more signals from a set of beams 310 of the second base station 105-c, such as SSBs transmitted in successive beams, and generate a best SSB time trace (BST). The BST, as will be discussed in more detail with respect to FIG. 4, may provide timing information associated with when different beams have a highest quality (e.g., a highest RSRP). In some cases, the UE 115-b may provide the BST to the first base station 105-b in a beam metric report. The first base station 105-b may then, based on the BST provided by the UE 115-b, predict a best SSB for a RACH procedure for the UE 115-a to perform an initial access procedure with the second base station 105-b (e.g., a best SSB for transmissions of RACH MSG1/MSG2/MSG3). In such cases, the first base station 105-a (or other network node) may only need to configure CSI-RS resources that are QCL'ed with the best SSB for the RACH procedure (e.g., for P2/P3 beam management for MSG1/2/3). The BST provided by the UE 115-b may also be used by the first base station 105-b or the second base station 105-c to determine regular beam management periodicity after initial access (e.g., after MSG1/2/3). For example, P1 periodicity can be based on SSB beam dwelling time estimated based on the BST.

Figure 4:
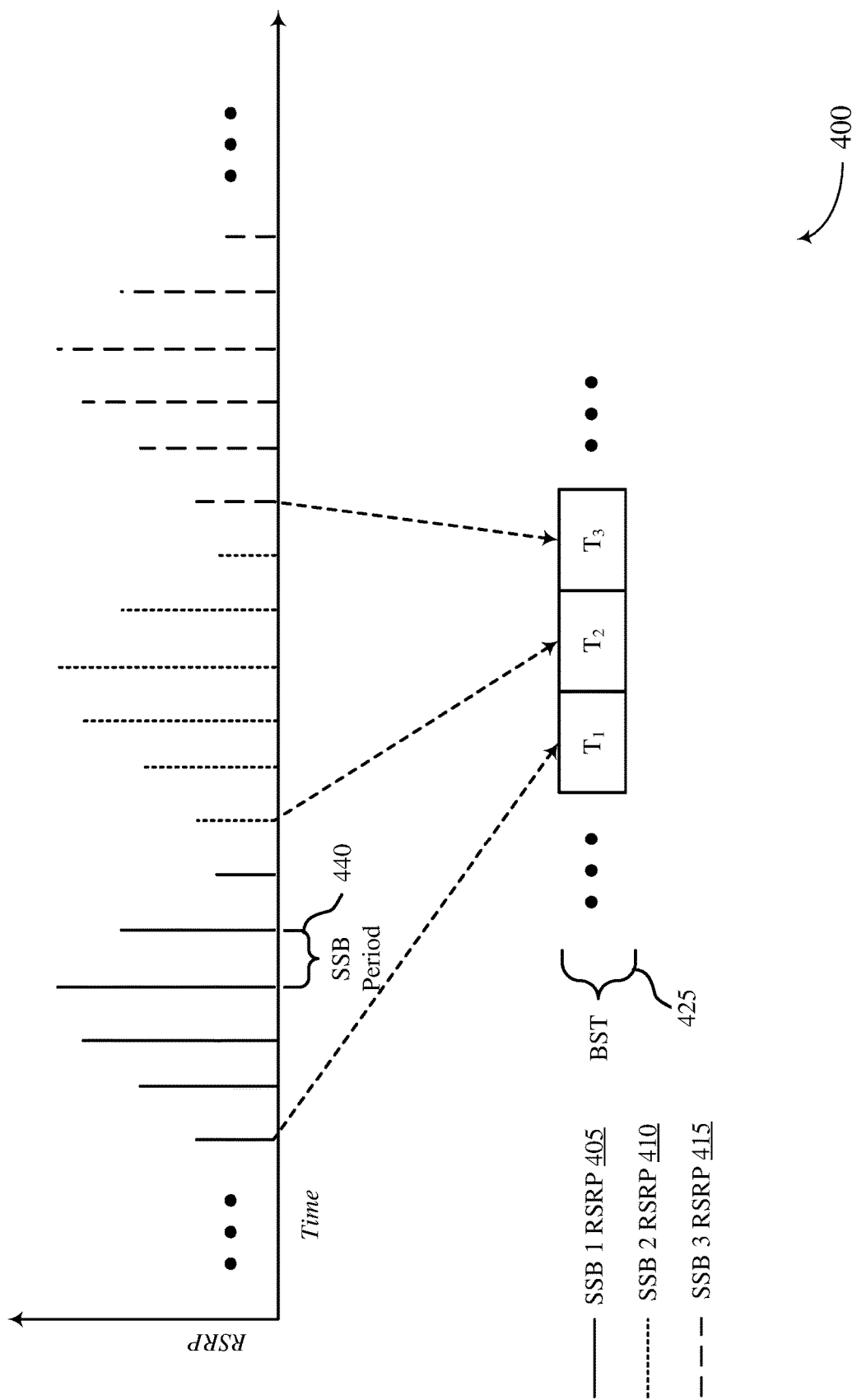
FIG. 4 illustrates an example of a best SSB time trace (BST) that supports beam switch related information feedback in wireless communications in accordance with aspects of the present disclosure.

FIG. 4 illustrates an example of a best SSB time trace (BST) 400 that supports beam switch related information feedback in wireless communications in accordance with aspects of the present disclosure. In some examples, best SSB time trace (BST) 400 may implement aspects of wireless communications system 100 or 300. In this example, the UE may provide a BST 425 that includes a time that a given SSB of a given cell on the second frequency range (e.g., FR2) becomes a best SSB (e.g., based on RSRP).

In the example of FIG. 4, the UE may measure a RSRP from a first SSB 405 that exceed other RSRPs of other SSBs, and identify a first time (T1). SSBs may be transmitted according to SSB period 440 in this example, and the first time may be provided as an indication of a SSB period index, in some examples. At a second time ($T_2$), the UE may determine that a second SSB RSRP 410 is higher than other RSRPs, and may record $T_2$ in the BST 425. Likewise, at a third time ($T_3$) the UE may determine that a third SSB RSRP 415 is higher than other RSRPs, and may record $T_3$ in the BST 425. The BST 425 may be provided to a base station (e.g., a master node in a NSA dual connectivity (DC) deployment), which may determine a best SSB to be used by the UE for a subsequent initial access procedure, as will be discussed in more detail in FIG. 5. In some cases, the UE may only record BST for stationary cells, since predicting a best SSB or cell may only be accurate for stationary cells (e.g., based on a stationary/mobile flag). In some cases, the UE may only record and report BST 425 when a speed of the UE exceeds a threshold value, since prediction may not be necessary for stationary or relatively slow speeds. In some cases, the threshold value for such speed may be configured by the base station.

Figure 5:
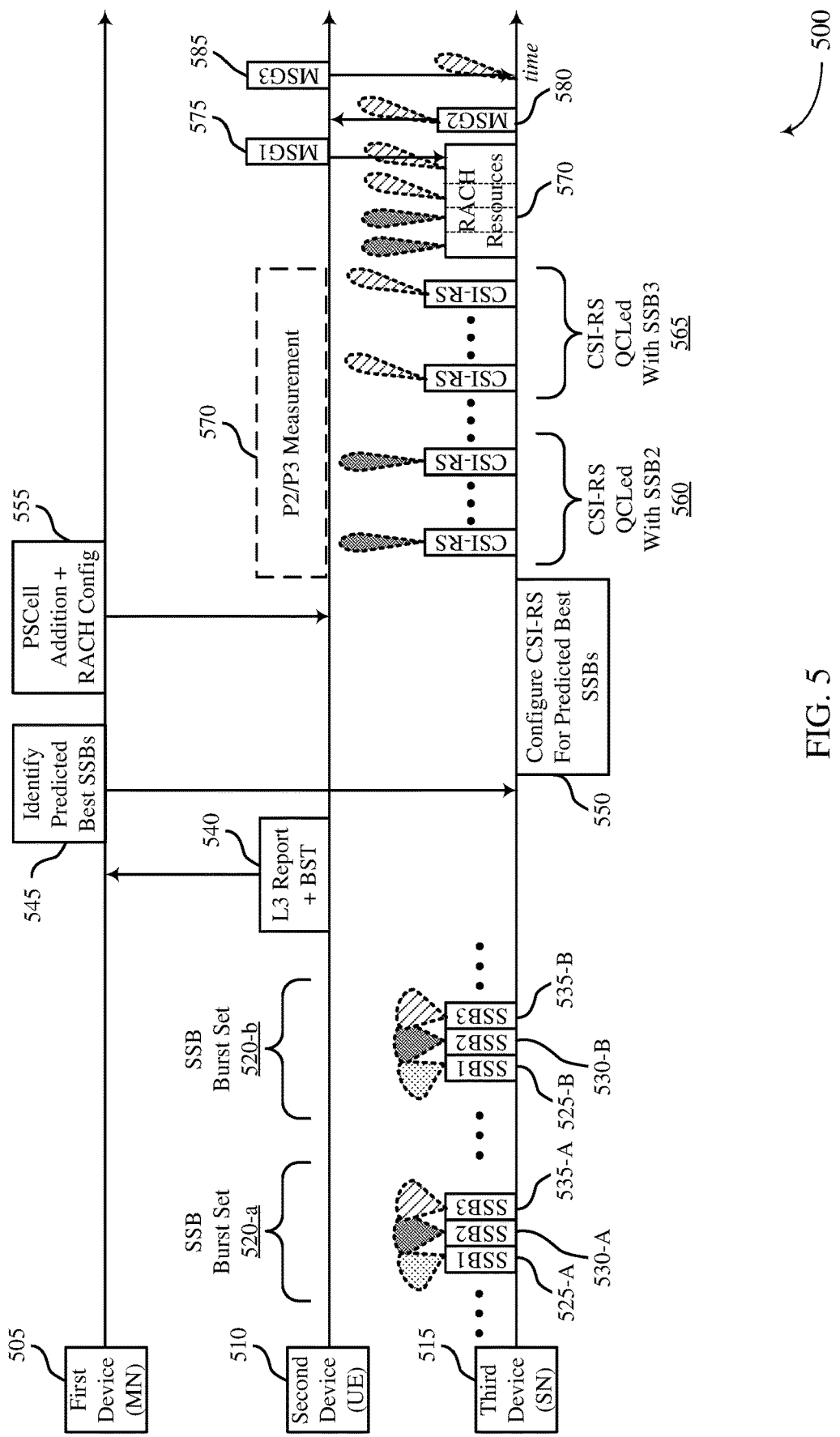
FIG. 5 illustrates an example of a process flow for secondary node access based on a BST in accordance with aspects of the present disclosure.

FIG. 5 illustrates an example of a process flow 500 for secondary node access based on a BST that supports beam switch related information feedback in wireless communications in accordance with aspects of the present disclosure. In some examples, process flow 500 may implement aspects of wireless communications system 100, 200, or 300. In this example, a first device 505 (e.g., a master node or master base station) may establish a connection with a second device 510 (e.g., a UE). The second device 510 may desire to establish a secondary connection with a third device 515 (e.g., a secondary node or secondary base station) that uses beamformed communications.

In this example, the third device 515 may transmit SSB bursts 520, which may include a number of SSBs, such as a first SSB 525, a second SSB 530, and a third SSB 535, using associated transmit beams. The second device 510 may measure signals provided in the SSB bursts 520 (e.g., a RSRP) and record a BST, such as discussed with respect to FIG. 4. The second device 510 may, at 540, transmit a L3 report that identifies the cell IDs and SSBs that are measured, and the BST to the first device 505.

At 545, the first device 505 may identify one or more predicted best SSBs for an initial access procedure of the second device 510 with the third device 515. In some cases, the predicted best SSBs may be determined based on a rate of change of best SSBs indicated the BST, and a time period between the BST and the initial access. The first device 505 may provide information related to the second device 510 and the predicted best SSBs to the third device.

At 550, the third device 515 may configure CSI-RS resources for the predicted best SSBs, and initiate CSI-RS transmissions for beam management (e.g., P2/P3 procedures). In this example, the third device 515 may configure CSI-RS for P2/P3 only for SSB2 and SSB3, which may save overhead and latency relative to configurations that provide CSI-RS for P2/P3 on additional SSBs.

At 555, the first device 505 may configure a PSCell addition and RACH configuration for the second device 510, and provide such information to the second device 510 for initiating access with the third device 515. The third device 515 may transmit CSI-RSs using the identified best SSBs. In this example, the first device 505 may identify SSB2 and SSB3 as the best SSBs, and the third device 515 may transmit CSI-RS transmissions 560 that are QCL'ed with SSB2, and CSI-RS transmissions 565 that are QCL'ed with SSB3. The second device 510, at 570, may perform P2/P3 measurements on the CSI-RS transmissions and identify a particular RACH resource 570 (e.g., a RACH resource that is QCL'ed with SSB3 based on the measurements at the second device 510).

At 575, the second device 510 may transmit a RACH MSG1 transmission to the third device 515. The third device 515 may receive the MSG1 transmission, and identify that a beam associated with SSB3 was used for the transmission. At 580, the third device 515 may transmit a responsive MSG2 transmission to the second device 510 using the identified beam associated with SSB3. The second device 510 may then, at 585 transmit a RACH MSG3 transmission to the third device 515, and RRC connection establishment signaling may be used to complete the connection between the second device 510 and the third device 515.

Figure 6:
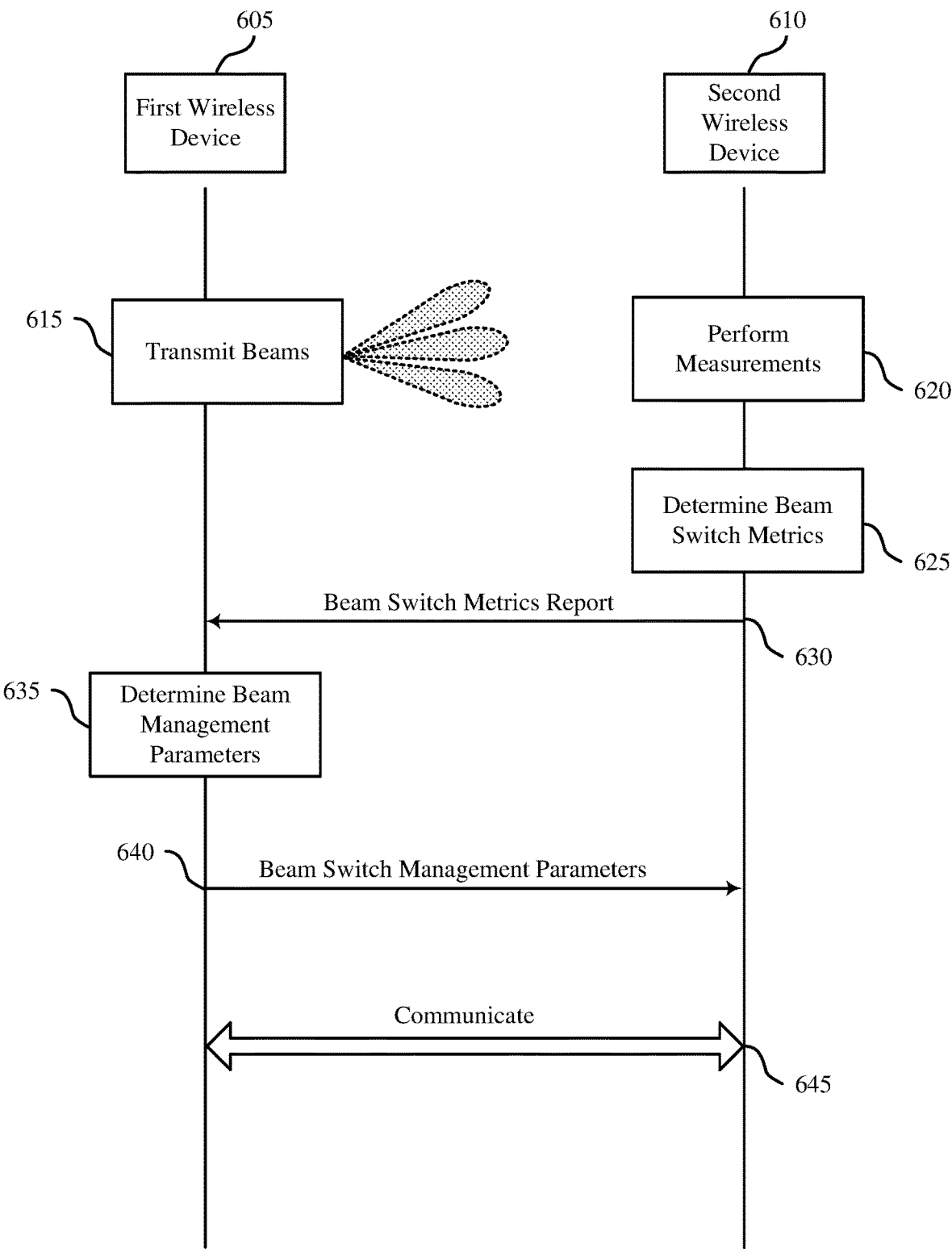
FIG. 6 illustrates an example of a process flow that supports beam switch related information feedback in wireless communications in accordance with aspects of the present disclosure.

FIG. 6 illustrates an example of a process flow 600 that supports beam switch related information feedback in wireless communications in accordance with aspects of the present disclosure. In some examples, process flow 600 may implement aspects of wireless communications system 100, 200, or 300. In this example, process flow 600 includes a first wireless device 605, which may be an example of a base station 105, a TRP, or a UE 115, as described with reference to FIGS. 1 through 3. Additionally, process flow 600 includes a second wireless device 610, which may be an example of a UE 115 or another device that communicates with, for example, the first wireless device 605.

At 615, the first wireless device 605 may transmit a number of transmission beams. Such transmission beams may include SSBs, CSI-RS transmissions, or combinations thereof, which may be used for beam management by the first wireless device 605 and the second wireless device 610 (e.g., P1/P2/P3 procedures).

At 620, the second wireless device 610 may perform measurements based on signals received via the transmit beams. Such measurements may include, for example, RSRP measurements, signal to interference and noise ratio (SINR) measurements, Doppler measurements, and the like. In some cases, the second wireless device 610 may also measure one or more other parameters, such as a speed of the device, a distance to the first wireless device 605, an angular speed of the device, beam dwelling times, movement profiles, or any combinations thereof.

At 625, the second wireless device 610 may determine one or more beam switch metrics. In some cases, such beam switch metrics may include one or more of a speed of the second wireless device 610, a Doppler shift of one or more transmission beams observed at the second wireless device 610, a distance between the second wireless device 610 and the first wireless device 605, a dwelling time that indicates an expected time duration during which a transmission beam will have more favorable channel conditions than any other of the set of transmission beams of the first device, a dwelling time that indicates an expected time duration during which a receive beam of the second wireless device 610 will provide more favorable receive conditions than any of a set of other receive beams of the second wireless device 610, a time trace of consecutive transmission beams having a highest quality at the second wireless device 610 for a prior time period, a second wireless device 610 movement profile that includes information related to the second wireless device 610 movement speed and direction, spatial location changes, a calculated beam switch periodicity, or any combinations thereof. The second wireless device 610 may transmit, at 630, a beam switch metrics report to the first wireless device 605.

At 635, the first wireless device 605 may determine one or more beam management parameters based on the beam switch metrics report. In some cases, the first wireless device 605 may adjust a periodicity and beams for transmissions of reference signals, such as synchronization signals or CSI-RS transmissions. Such adjustments may provide sufficient signals for reliable beam switching, while reducing overhead by avoiding transmissions that are not needed to maintain connectivity via the beams. The first wireless device 605 may transmit, at 640, beam switch management parameters to the second wireless device 610. The first wireless device 605 and the second wireless device 610 may then communicate, at 645, in accordance with the provided beam switch management parameters.

Figure 7:
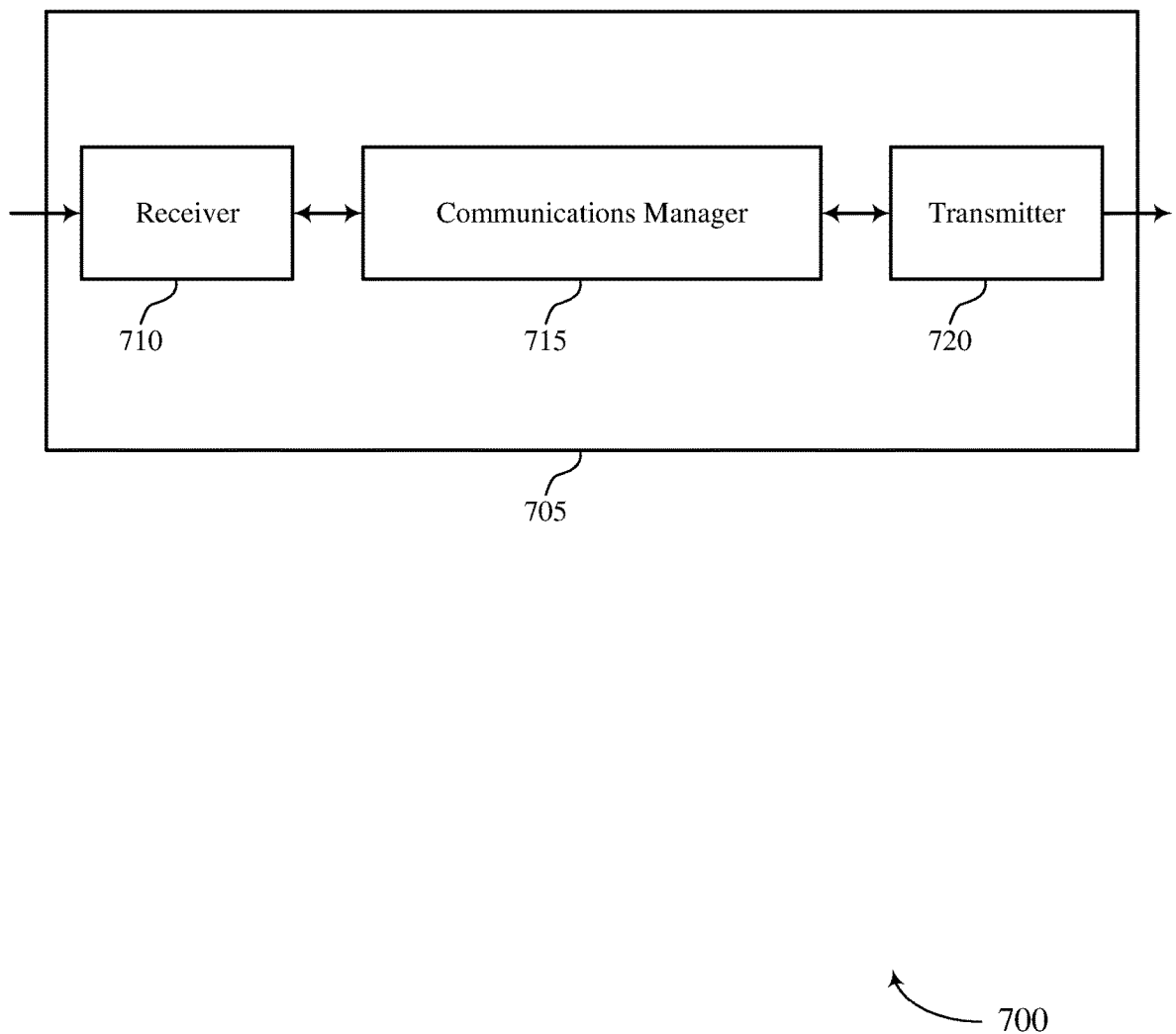
FIGS. 7 and 8 show block diagrams of devices that support beam switch related information feedback in wireless communications in accordance with aspects of the present disclosure.

FIG. 7 shows a block diagram 700 of a device 705 that supports beam switch related information feedback in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam switch related information feedback in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a set of beams associated with a first device, each of the set of beams of the first device having a different direction relative to the first device, determine, based on the set of beams of the first device, one or more beam switch metrics associated with a beam switch periodicity for switching a second device between two or more of the set of beams of the first device, and transmit a report to the first device or a third device that indicates the one or more beam switch metrics.

The communications manager 715 may also identify a set of receive beams associated with the second device, each of the set of receive beams of the second device having a different direction relative to the second device, determine, based on the set of receive beams of the second device, one or more beam switch metrics associated with a beam switch periodicity for switching the second device between two or more of the set of receive beams, and transmit a report to a first device or a third device that indicates the one or more beam switch metrics. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
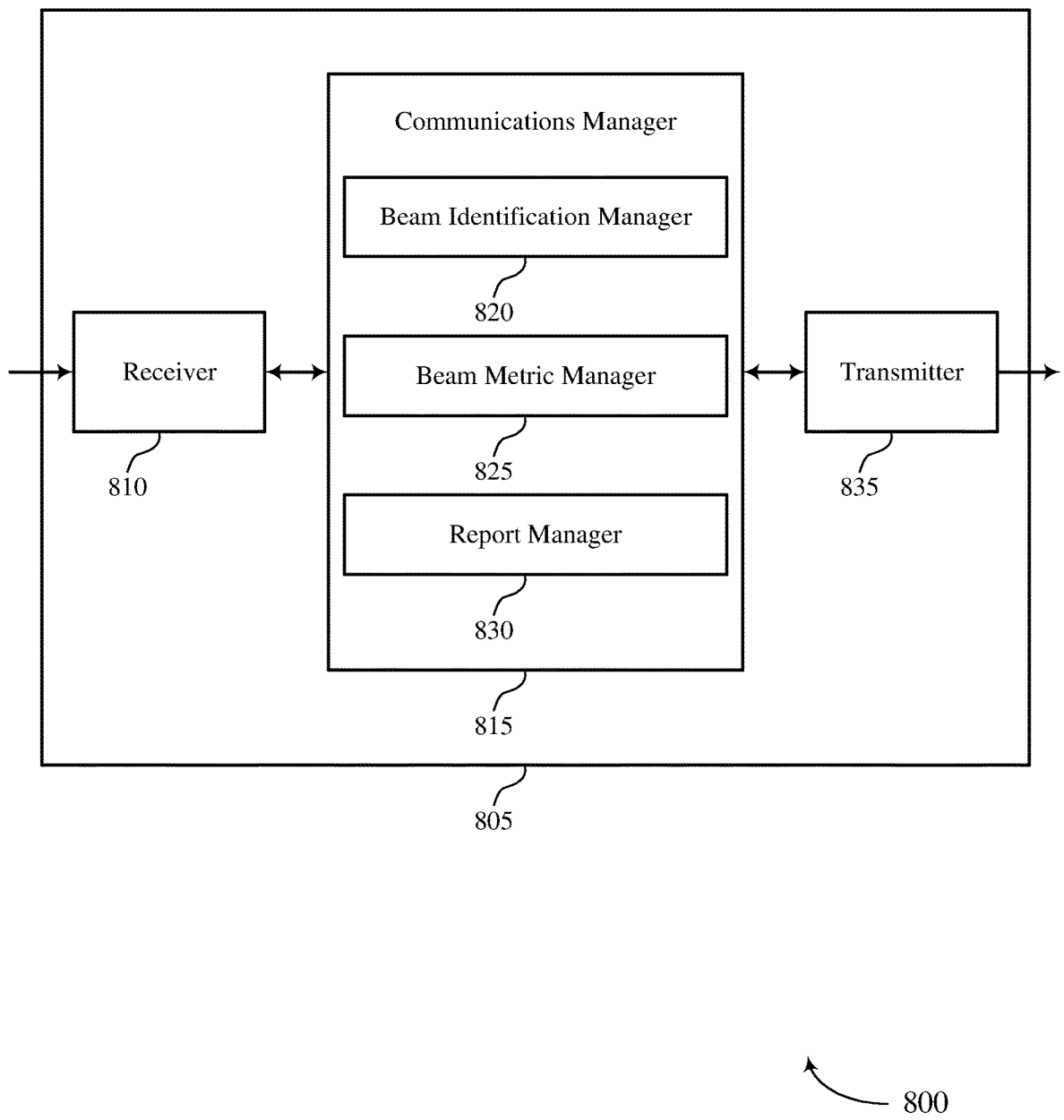

FIG. 8 shows a block diagram 800 of a device 805 that supports beam switch related information feedback in wireless communications in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to beam switch related information feedback in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a beam identification manager 820, a beam metric manager 825, and a report manager 830. The communications manager 815 may be an example of aspects of the communications manager 1010 described herein.

The beam identification manager 820 may identify a set of beams associated with a first device, each of the set of beams of the first device having a different direction relative to the first device. In some cases, the beam identification manager 820 may identify a set of receive beams associated with the second device, each of the set of receive beams of the second device having a different direction relative to the second device.

The beam metric manager 825 may determine, based on the set of beams of the first device, one or more beam switch metrics associated with a beam switch periodicity for switching a second device between two or more of the set of beams of the first device. In some cases, the beam metric manager 825 may determine, based on a set of receive beams of the second device, one or more beam switch metrics associated with a beam switch periodicity for switching the second device between two or more of the set of receive beams.

The report manager 830 may transmit a report to the first device or a third device that indicates the one or more beam switch metrics.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
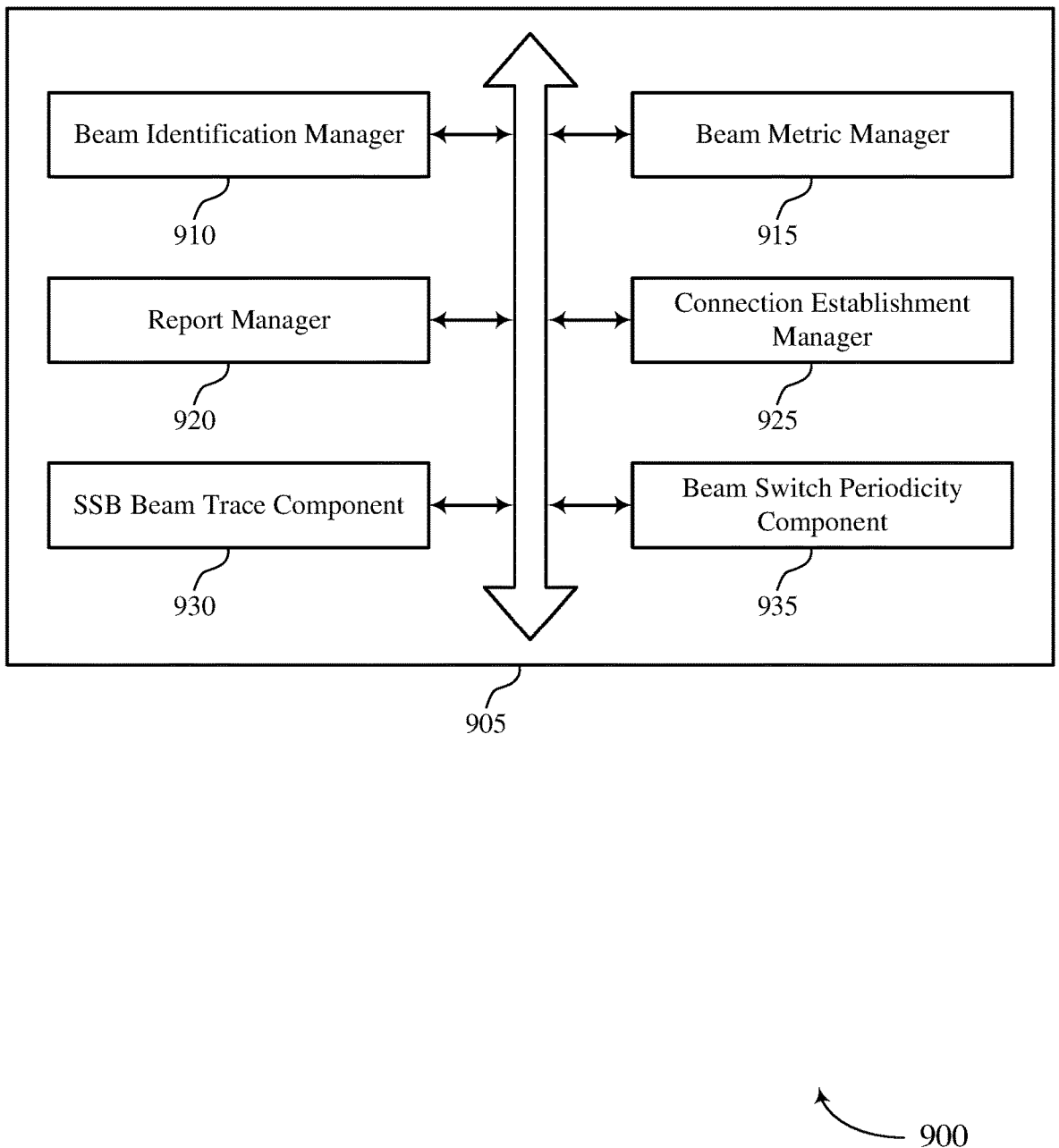
FIG. 9 shows a block diagram of a communications manager that supports beam switch related information feedback in wireless communications in accordance with aspects of the present disclosure.

FIG. 9 shows a block diagram 900 of a communications manager 905 that supports beam switch related information feedback in wireless communications in accordance with aspects of the present disclosure. The communications manager 905 may be an example of aspects of a communications manager 715, a communications manager 815, or a communications manager 1010 described herein. The communications manager 905 may include a beam identification manager 910, a beam metric manager 915, a report manager 920, a connection establishment manager 925, a SSB beam trace component 930, and a beam switch periodicity component 935. Each of these modules may communicate, directly or indirectly, with one another (e.g., via one or more buses).

The beam identification manager 910 may identify a set of beams associated with a first device, each of the set of beams of the first device having a different direction relative to the first device. In some examples, the beam identification manager 910 may identify a set of receive beams associated with the second device, each of the set of receive beams of the second device having a different direction relative to the second device.

In some examples, the beam identification manager 910 may identify a set of cells for which beam switch metrics are measurable. In some examples, the beam identification manager 910 may determine that at least one cell of the set of cells is a mobile cell and that one or more of the set of cells are stationary cells.

In some examples, the beam identification manager 910 may measure beam switch metrics of the one or more stationary cells. In some cases, the first device and the third device are each base stations, and the second device is a UE. In some cases, the first device and the third device are each base stations, and the second device is a UE.

The beam metric manager 915 may determine, based on the set of beams of the first device, one or more beam switch metrics associated with a beam switch periodicity for switching a second device between two or more of the set of beams of the first device. In some examples, the beam metric manager 915 may determine, based on a set of receive beams of the second device, one or more beam switch metrics associated with a beam switch periodicity for switching the second device between two or more of the set of receive beams.

In some examples, the beam metric manager 915 may determine to transmit the report based on a change in one or more of the beam switch metrics exceeding a threshold value. In some cases, the one or more beam switch metrics provide information for setting beam management transmissions in accordance with the beam switch periodicity for switching the second device between the two or more of the set of beams of the first device.

In some cases, beam switch metrics may include one or more of a speed of the second device, a Doppler shift of one or more transmission beams observed at the second device, a distance between the second device and the first wireless device 605, a dwelling time that indicates an expected time duration during which a transmission beam will have more favorable channel conditions than any other of the set of transmission beams of the first device, a dwelling time that indicates an expected time duration during which a receive beam of the second device will provide more favorable receive conditions than any of a set of other receive beams of the second device, a time trace of consecutive transmission beams having a highest quality at the second device for a prior time period, a second device movement profile that includes information related to the second device movement speed and direction, spatial location changes, or combinations thereof, a calculated beam switch periodicity, or any combinations thereof. In some cases, the quality includes one or more of a received signal strength or signal to interference and noise ratio (SINR).

In some cases, the reported metrics may include an average value of the associated beam switch metric, a median value of the associated beam switch metric, a percentile of the associated beam switch metric, a maximum value of the associated beam switch metric during a predetermined time period, a minimum value of the associated beam switch metric during the predetermined time period, a histogram of observed beam switch metrics for the predetermined time period, or any combinations thereof.

The report manager 920 may transmit a report to the first device or a third device that indicates the one or more beam switch metrics. In some examples, the report manager 920 may receive configuration information from the first device that indicates a periodicity for transmitting the report. In some examples, the report manager 920 may transmit the report according to the periodicity for transmitting the report. In some cases, the report is transmitted autonomously by the second device. In some cases, the report is transmitted in a MAC-CE. In some cases, the report further includes a cell identification associated with the one or more beam switch metrics.

The connection establishment manager 925 may receive a control information transmission from the third device that indicates the second device is to transmit the initial access request to the first device, and that indicates one or more SSB transmissions of the first device that are to be monitored for reference signal transmissions to determine a preferred transmission beam for subsequent communications with the first device.

The SSB beam trace component 930 may identify a first time at which a first SSB transmission of the first device that has more favorable channel conditions than one or more other SSB transmissions of the first device. In some examples, the SSB beam trace component 930 may identify a second time at which a second SSB transmission of the first device has more favorable channel conditions than the first SSB transmission and one or more other of the SSB transmissions of the first device. In some examples, the SSB beam trace component 930 may provide at least the first time and the second time to the third device in a BST beam switch metric.

The beam switch periodicity component 935 may determine, based on one or more of the beam switch metrics, the beam switch periodicity, where the beam switch periodicity indicates a rate at which transmission beams having more favorable transmission beam channel conditions than other of the set of transmission beams changes at the second device. In some examples, the beam switch periodicity component 935 may transmit the determined beam switch periodicity to the first device or the second device.

Figure 10:
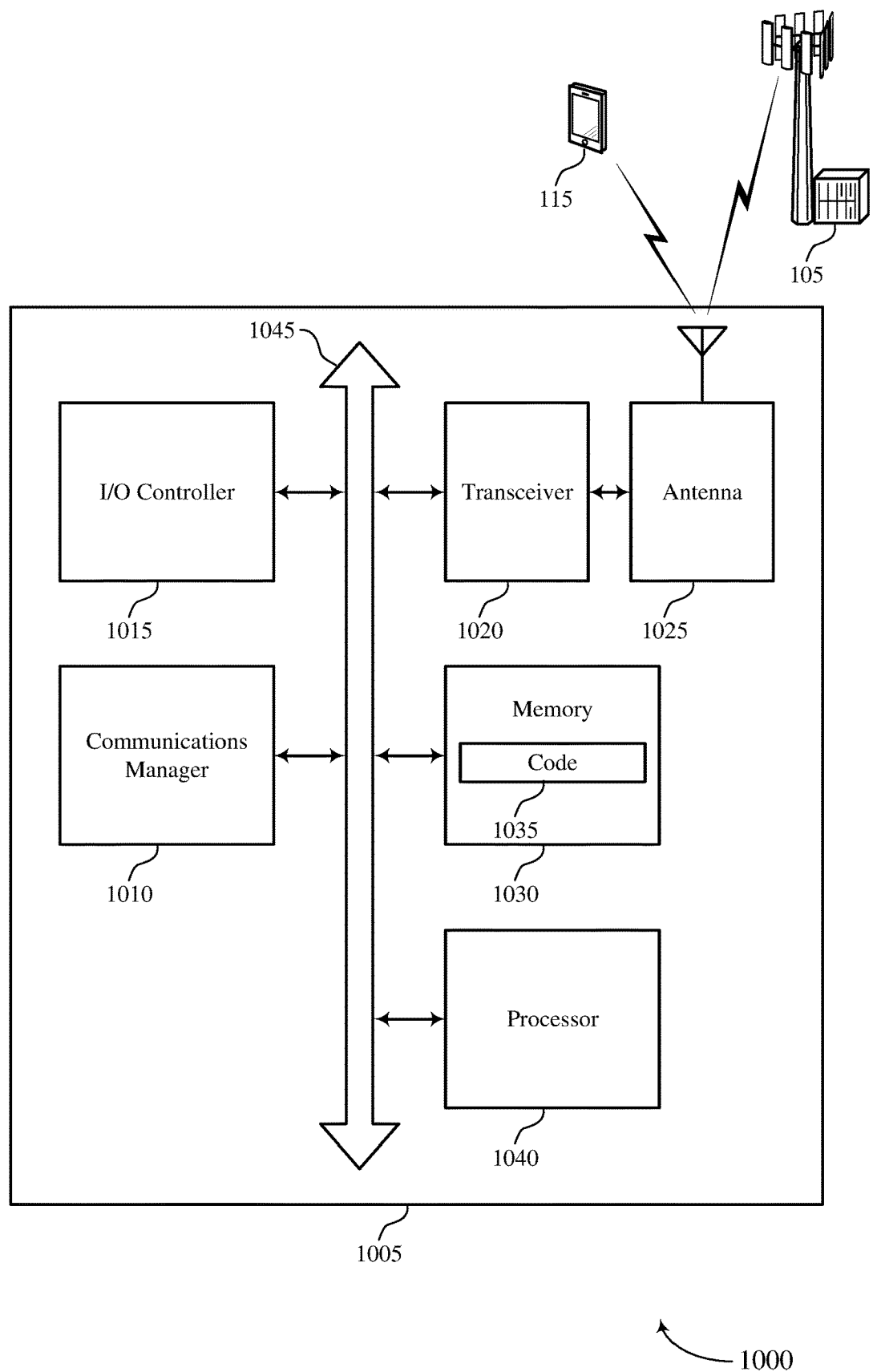
FIG. 10 shows a diagram of a system including a device that supports beam switch related information feedback in wireless communications in accordance with aspects of the present disclosure.

FIG. 10 shows a diagram of a system 1000 including a device 1005 that supports beam switch related information feedback in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a set of beams associated with a first device, each of the set of beams of the first device having a different direction relative to the first device, determine, based on the set of beams of the first device, one or more beam switch metrics associated with a beam switch periodicity for switching a second device between two or more of the set of beams of the first device, and transmit a report to the first device or a third device that indicates the one or more beam switch metrics.

The communications manager 1010 may also identify a set of receive beams associated with the second device, each of the set of receive beams of the second device having a different direction relative to the second device, determine, based on the set of receive beams of the second device, one or more beam switch metrics associated with a beam switch periodicity for switching the second device between two or more of the set of receive beams, and transmit a report to a first device or a third device that indicates the one or more beam switch metrics.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam switch related information feedback in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
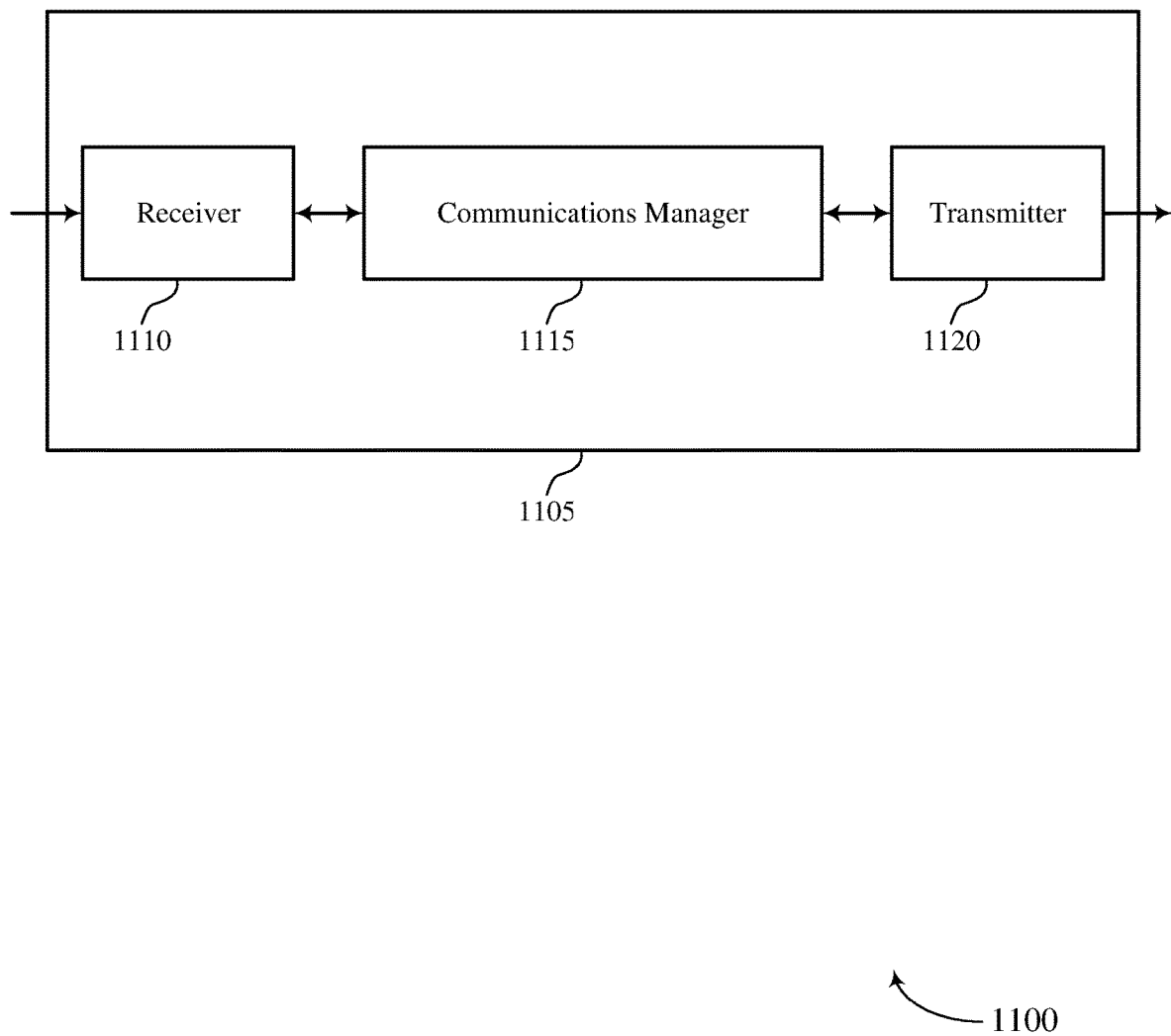
FIGS. 11 and 12 show block diagrams of devices that support beam switch related information feedback in wireless communications in accordance with aspects of the present disclosure.

FIG. 11 shows a block diagram 1100 of a device 1105 that supports beam switch related information feedback in wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam switch related information feedback in wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may establish a connection with a second device, receive, from the second device, a report that indicates one or more beam switch metrics associated with a set of transmission beams received at the second device, determine, based on the report, one or more beam management parameters for one or more transmissions to the second device via one or more of the set of transmission beams, and transmit the one or more beam management parameters to the second device. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
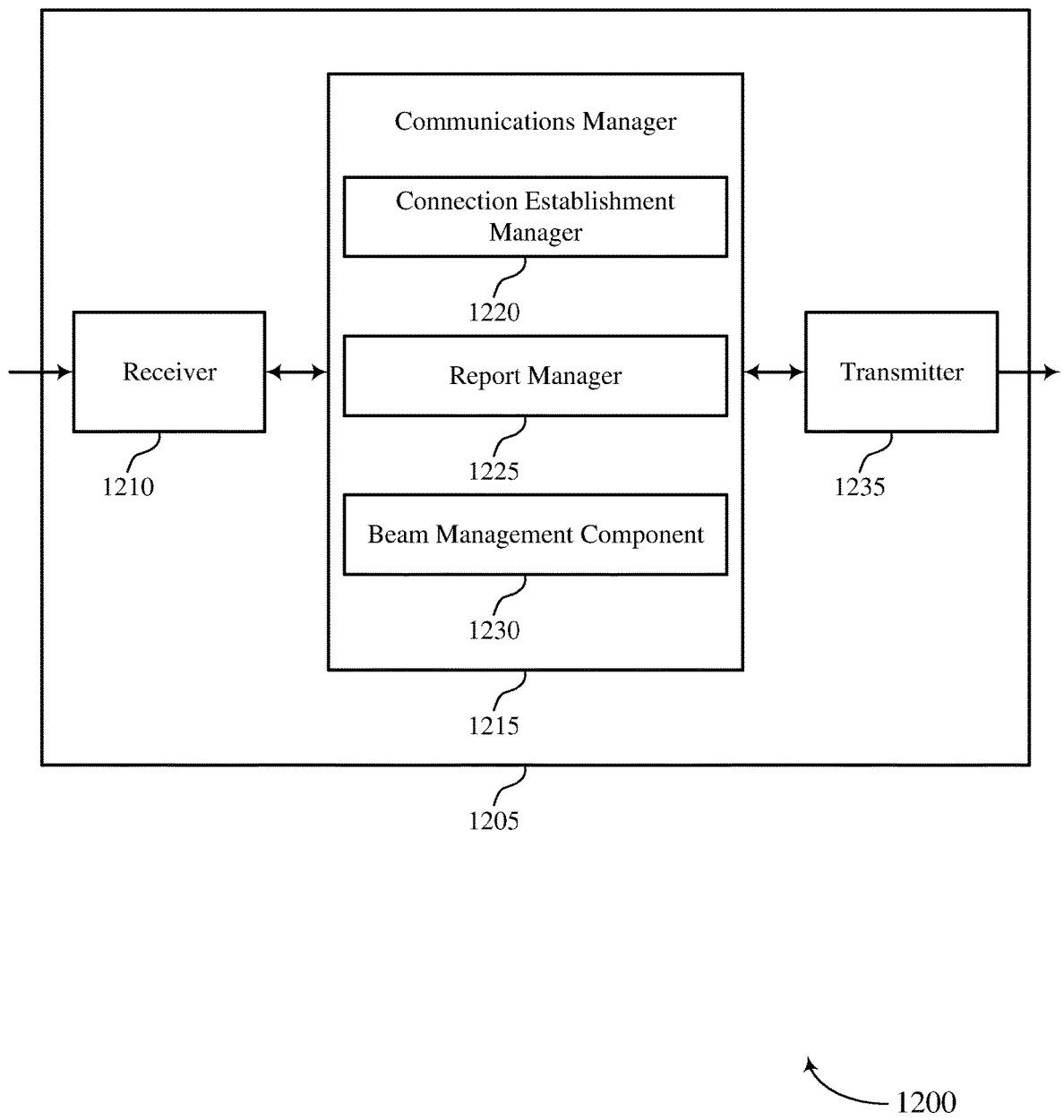

FIG. 12 shows a block diagram 1200 of a device 1205 that supports beam switch related information feedback in wireless communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to beam switch related information feedback in wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a connection establishment manager 1220, a report manager 1225, and a beam management component 1230. The communications manager 1215 may be an example of aspects of the communications manager 1410 described herein.

The connection establishment manager 1220 may establish a connection with a second device.

The report manager 1225 may receive, from the second device, a report that indicates one or more beam switch metrics associated with a set of transmission beams received at the second device.

The beam management component 1230 may determine, based on the report, one or more beam management parameters for one or more transmissions to the second device via one or more of the set of transmission beams and transmit the one or more beam management parameters to the second device.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
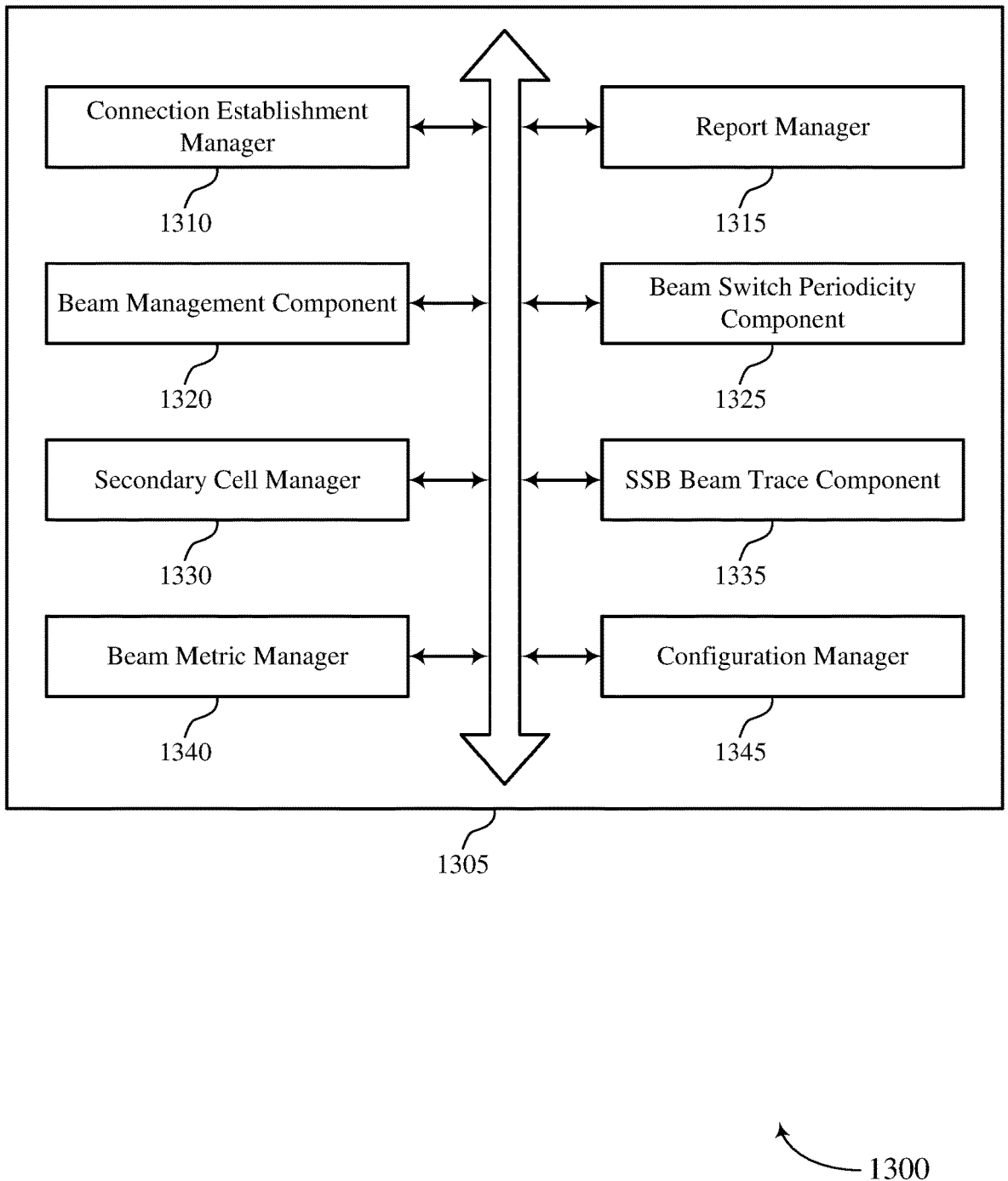
FIG. 13 shows a block diagram of a communications manager that supports beam switch related information feedback in wireless communications in accordance with aspects of the present disclosure.

FIG. 13 shows a block diagram 1300 of a communications manager 1305 that supports beam switch related information feedback in wireless communications in accordance with aspects of the present disclosure. The communications manager 1305 may be an example of aspects of a communications manager 1115, a communications manager 1215, or a communications manager 1410 described herein. The communications manager 1305 may include a connection establishment manager 1310, a report manager 1315, a beam management component 1320, a beam switch periodicity component 1325, a secondary cell manager 1330, a SSB beam trace component 1335, a beam metric manager 1340, and a configuration manager 1345. Each of these modules may communicate, directly or indirectly, with one another (e.g., via one or more buses).

The connection establishment manager 1310 may establish a connection with a second device.

The report manager 1315 may receive, from the second device, a report that indicates one or more beam switch metrics associated with a set of transmission beams received at the second device. In some examples, the report manager 1315 may monitor for the report from the second device according to the periodic transmission schedule. In some cases, the report is transmitted autonomously by the second device. In some cases, the report is received in a MAC-CE from the second device.

The beam management component 1320 may determine, based on the report, one or more beam management parameters for one or more transmissions to the second device via one or more of the set of transmission beams. In some examples, the beam management component 1320 may transmit the one or more beam management parameters to the second device. In some cases, the first device is a base station, and the second device is a UE. In some cases, the report further includes a cell identification associated with the one or more beam switch metrics.

The beam switch periodicity component 1325 may determine, based on one or more of the beam switch metrics, a beam switch periodicity of the second device that indicates a rate at which transmission beams having more favorable transmission beam channel conditions than other of the set of transmission beams changes at the second device, and where the one or more beam management parameters are based on the beam switch periodicity. In some cases, the one or more beam management parameters include a beam switch periodicity for switching the second device between two or more of the set of transmission beams.

The secondary cell manager 1330 may identify, by the first device based on the one or more beam switch metrics, a first transmission beam of the set of transmission beams for the second device to transmit an initial access request to the secondary base station. In some examples, the secondary cell manager 1330 may provide the secondary base station with the BST beam switch metric received from the second device. In some examples, the secondary cell manager 1330 may transmit to the second device, based on the BST beam switch metric, control information for the second device monitor one or more SSB transmissions and to transmit the initial access request.

The SSB beam trace component 1335 may receive a BST from a second device. In some cases, at least a subset of the set of transmission beams include a SSB transmission from the secondary base station, and where the report includes a BST beam switch metric that indicates two or more time periods and, for each of the two or more time periods, a preferred SSB of the second device.

In some cases, beam switch metrics may include one or more of a speed of the second device, a Doppler shift of one or more transmission beams observed at the second device, a distance between the second device and the first wireless device 605, a dwelling time that indicates an expected time duration during which a transmission beam will have more favorable channel conditions than any other of the set of transmission beams of the first device, a dwelling time that indicates an expected time duration during which a receive beam of the second device will provide more favorable receive conditions than any of a set of other receive beams of the second device, a time trace of consecutive transmission beams having a highest quality at the second device for a prior time period, a second device movement profile that includes information related to the second device movement speed and direction, spatial location changes, or combinations thereof, a calculated beam switch periodicity, or any combinations thereof. In some cases, the quality includes one or more of a received signal strength or signal to interference and noise ratio (SINR).

In some cases, the reported metrics may include an average value of the associated beam switch metric, a median value of the associated beam switch metric, a percentile of the associated beam switch metric, a maximum value of the associated beam switch metric during a predetermined time period, a minimum value of the associated beam switch metric during the predetermined time period, a histogram of observed beam switch metrics for the predetermined time period, or any combinations thereof.

The configuration manager 1345 may configure the second device to transmit the report based on a change in one or more of the beam switch metrics exceeding a threshold value. In some examples, the configuration manager 1345 may configure the second device to transmit the report according to a periodic transmission schedule.

Figure 14:
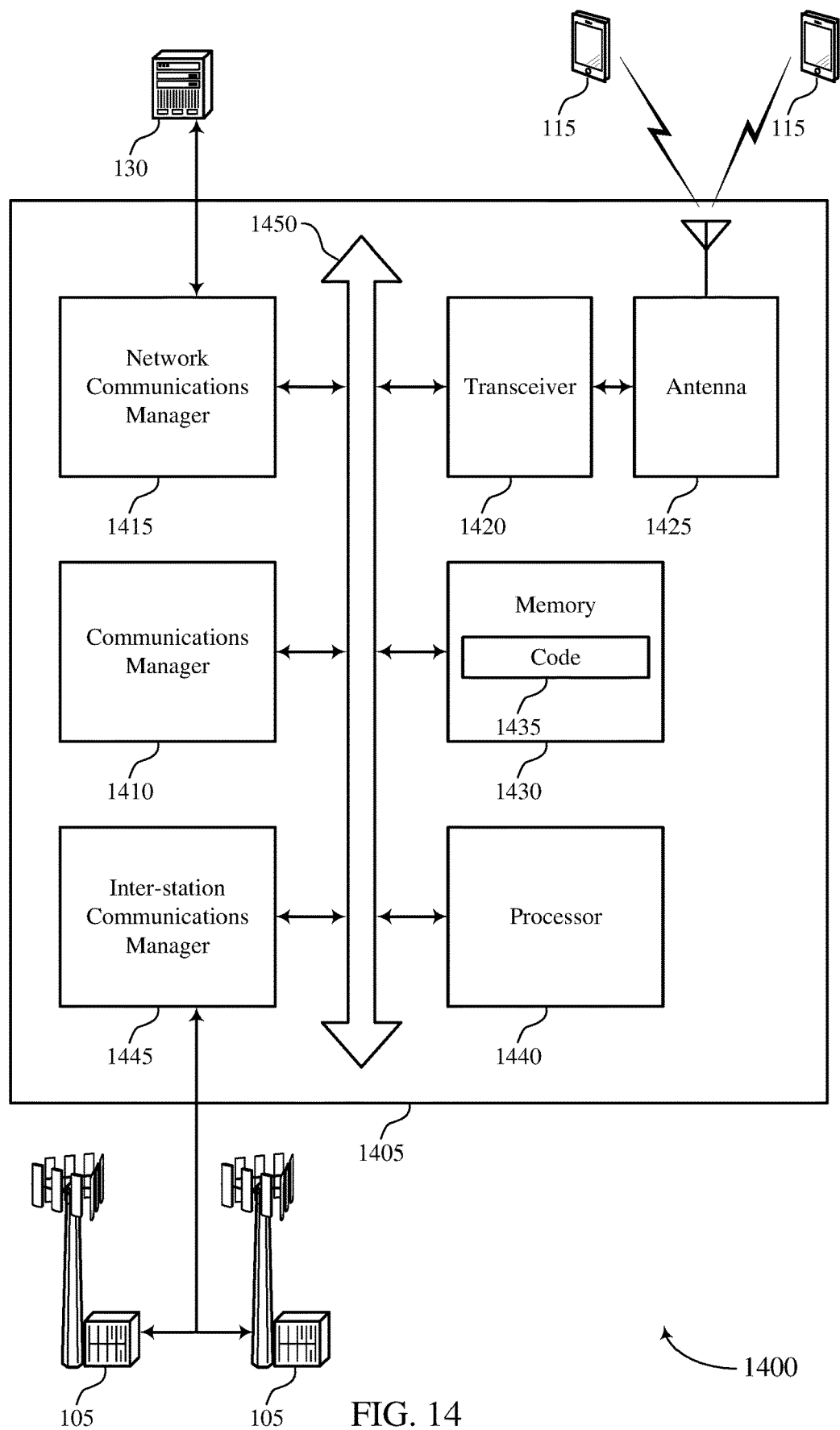
FIG. 14 shows a diagram of a system including a device that supports beam switch related information feedback in wireless communications in accordance with aspects of the present disclosure.

FIG. 14 shows a diagram of a system 1400 including a device 1405 that supports beam switch related information feedback in wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may establish a connection with a second device, receive, from the second device, a report that indicates one or more beam switch metrics associated with a set of transmission beams received at the second device, determine, based on the report, one or more beam management parameters for one or more transmissions to the second device via one or more of the set of transmission beams, and transmit the one or more beam management parameters to the second device.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam switch related information feedback in wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
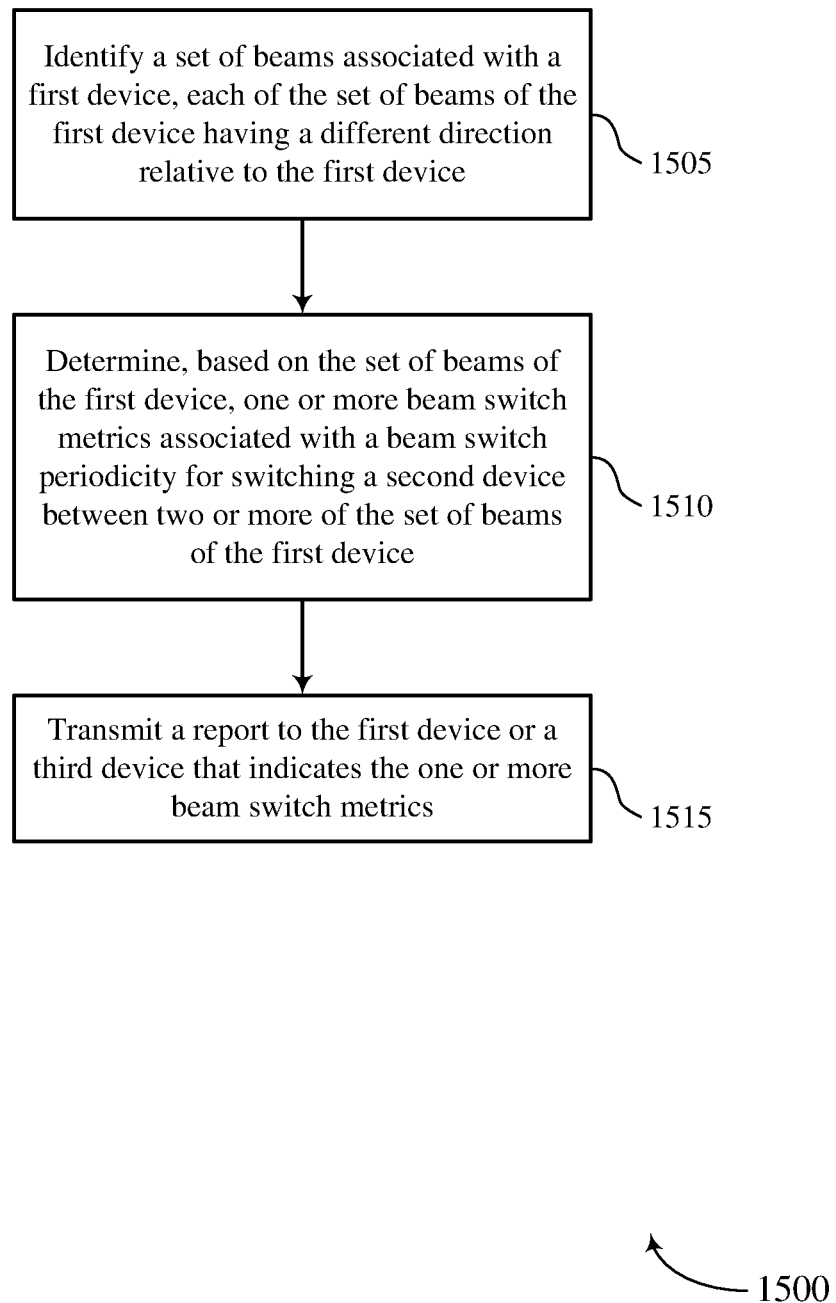
FIGS. 15 through 19 show flowcharts illustrating methods that support beam switch related information feedback in wireless communications in accordance with aspects of the present disclosure.

FIG. 15 shows a flowchart illustrating a method 1500 that supports beam switch related information feedback in wireless communications in accordance with aspects of the present disclosure. The operations of method 1500 may be implemented by a second device (e.g., a UE 115) or its components as described herein. For example, the operations of method 1500 may be performed by a communications manager as described with reference to FIGS. 7 through 10. In some examples, a second device may execute a set of instructions to control the functional elements of the second device to perform the functions described below. Additionally or alternatively, a second device may perform aspects of the functions described below using special-purpose hardware.

At 1505, the second device may identify a set of beams associated with a first device, each of the set of beams of the first device having a different direction relative to the first device. The operations of 1505 may be performed according to the methods described herein. In some examples, aspects of the operations of 1505 may be performed by a beam identification manager as described with reference to FIGS. 7 through 10.

At 1510, the second device may determine, based on the set of beams of the first device, one or more beam switch metrics associated with a beam switch periodicity for switching a second device between two or more of the set of beams of the first device. The operations of 1510 may be performed according to the methods described herein. In some examples, aspects of the operations of 1510 may be performed by a beam metric manager as described with reference to FIGS. 7 through 10.

At 1515, the second device may transmit a report to the first device or a third device that indicates the one or more beam switch metrics. The operations of 1515 may be performed according to the methods described herein. In some examples, aspects of the operations of 1515 may be performed by a report manager as described with reference to FIGS. 7 through 10.

Figure 16:
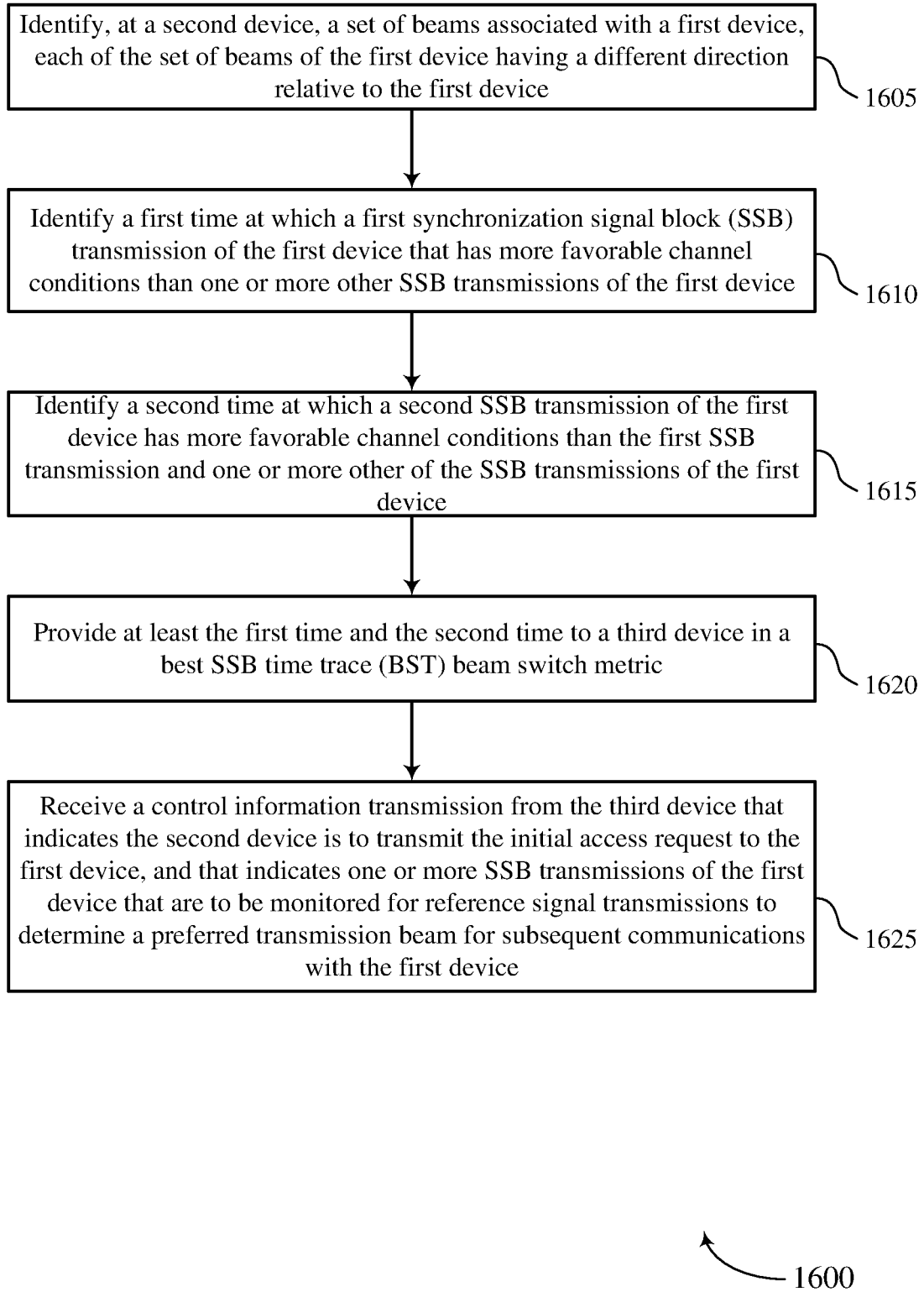

FIG. 16 shows a flowchart illustrating a method 1600 that supports beam switch related information feedback in wireless communications in accordance with aspects of the present disclosure. The operations of method 1600 may be implemented by a second device (e.g., a UE 115) or its components as described herein. For example, the operations of method 1600 may be performed by a communications manager as described with reference to FIGS. 7 through 10. In some examples, a second device may execute a set of instructions to control the functional elements of the second device to perform the functions described below. Additionally or alternatively, a second device may perform aspects of the functions described below using special-purpose hardware.

At 1605, the second device may identify a set of beams associated with a first device, each of the set of beams of the first device having a different direction relative to the first device. The operations of 1605 may be performed according to the methods described herein. In some examples, aspects of the operations of 1605 may be performed by a beam identification manager as described with reference to FIGS. 7 through 10.

At 1610, the second device may identify a first time at which a first synchronization signal block (SSB) transmission of the first device that has more favorable channel conditions than one or more other SSB transmissions of the first device. The operations of 1610 may be performed according to the methods described herein. In some examples, aspects of the operations of 1610 may be performed by a SSB beam trace component as described with reference to FIGS. 7 through 10.

At 1615, the second device may identify a second time at which a second SSB transmission of the first device has more favorable channel conditions than the first SSB transmission and one or more other of the SSB transmissions of the first device. The operations of 1615 may be performed according to the methods described herein. In some examples, aspects of the operations of 1615 may be performed by a SSB beam trace component as described with reference to FIGS. 7 through 10.

At 1620, the second device may provide at least the first time and the second time to the third device in a best SSB time trace (BST) beam switch metric. The operations of 1620 may be performed according to the methods described herein. In some examples, aspects of the operations of 1620 may be performed by a SSB beam trace component as described with reference to FIGS. 7 through 10.

At 1625, the second device may receive a control information transmission from the third device that indicates the second device is to transmit the initial access request to the first device, and that indicates one or more SSB transmissions of the first device that are to be monitored for reference signal transmissions to determine a preferred transmission beam for subsequent communications with the first device. The operations of 1625 may be performed according to the methods described herein. In some examples, aspects of the operations of 1625 may be performed by a connection establishment manager as described with reference to FIGS. 7 through 10.

Figure 17:
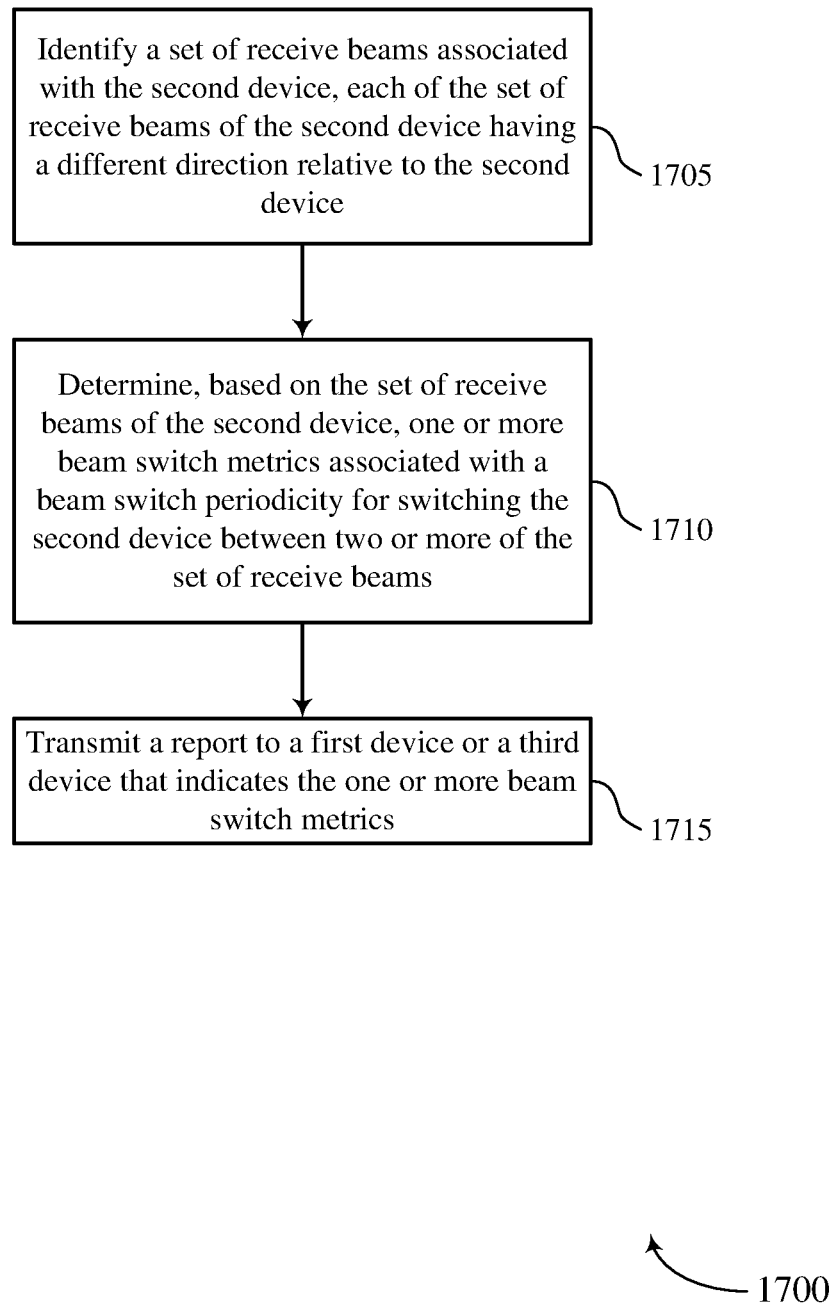

FIG. 17 shows a flowchart illustrating a method 1700 that supports beam switch related information feedback in wireless communications in accordance with aspects of the present disclosure. The operations of method 1700 may be implemented by a second device (e.g. a UE 115) or its components as described herein. For example, the operations of method 1700 may be performed by a communications manager as described with reference to FIGS. 7 through 10. In some examples, a second device may execute a set of instructions to control the functional elements of the second device to perform the functions described below. Additionally or alternatively, a second device may perform aspects of the functions described below using special-purpose hardware.

At 1705, the second device may identify a set of receive beams associated with the second device, each of the set of receive beams of the second device having a different direction relative to the second device. The operations of 1705 may be performed according to the methods described herein. In some examples, aspects of the operations of 1705 may be performed by a beam identification manager as described with reference to FIGS. 7 through 10.

At 1710, the second device may determine, based on the set of receive beams of the second device, one or more beam switch metrics associated with a beam switch periodicity for switching the second device between two or more of the set of receive beams. The operations of 1710 may be performed according to the methods described herein. In some examples, aspects of the operations of 1710 may be performed by a beam metric manager as described with reference to FIGS. 7 through 10.

At 1715, the second device may transmit a report to a first device or a third device that indicates the one or more beam switch metrics. The operations of 1715 may be performed according to the methods described herein. In some examples, aspects of the operations of 1715 may be performed by a report manager as described with reference to FIGS. 7 through 10.

Figure 18:
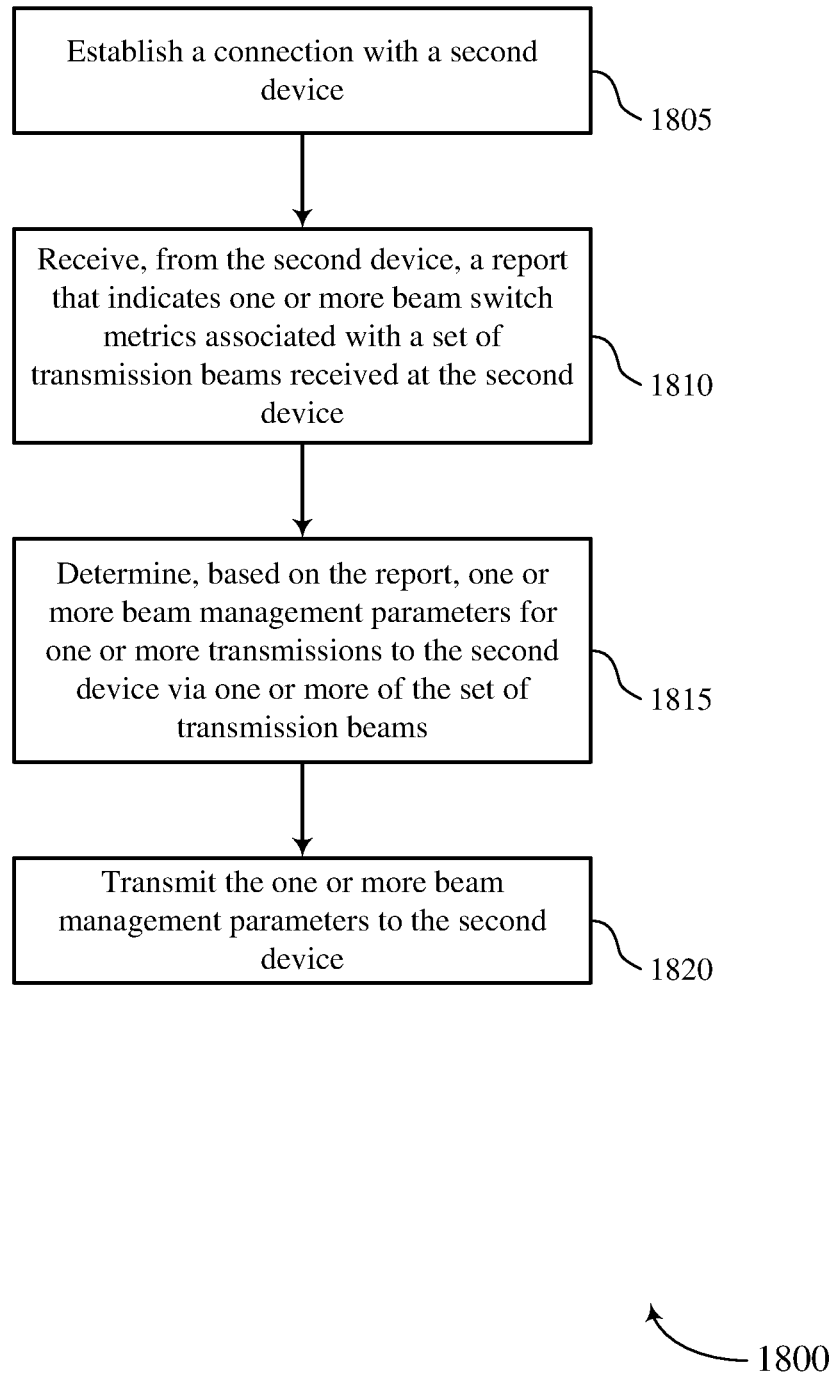

FIG. 18 shows a flowchart illustrating a method 1800 that supports beam switch related information feedback in wireless communications in accordance with aspects of the present disclosure. The operations of method 1800 may be implemented by a first device (e.g. a base station 105) or its components as described herein. For example, the operations of method 1800 may be performed by a communications manager as described with reference to FIGS. 11 through 14. In some examples, a first device may execute a set of instructions to control the functional elements of the first device to perform the functions described below. Additionally or alternatively, a first device may perform aspects of the functions described below using special-purpose hardware.

At 1805, the first device may establish a connection with a second device. The operations of 1805 may be performed according to the methods described herein. In some examples, aspects of the operations of 1805 may be performed by a connection establishment manager as described with reference to FIGS. 11 through 14.

At 1810, the first device may receive, from the second device, a report that indicates one or more beam switch metrics associated with a set of transmission beams received at the second device. The operations of 1810 may be performed according to the methods described herein. In some examples, aspects of the operations of 1810 may be performed by a report manager as described with reference to FIGS. 11 through 14.

At 1815, the first device may determine, based on the report, one or more beam management parameters for one or more transmissions to the second device via one or more of the set of transmission beams. The operations of 1815 may be performed according to the methods described herein. In some examples, aspects of the operations of 1815 may be performed by a beam management component as described with reference to FIGS. 11 through 14.

At 1820, the first device may transmit the one or more beam management parameters to the second device. The operations of 1820 may be performed according to the methods described herein. In some examples, aspects of the operations of 1820 may be performed by a beam management component as described with reference to FIGS. 11 through 14.

Figure 19:
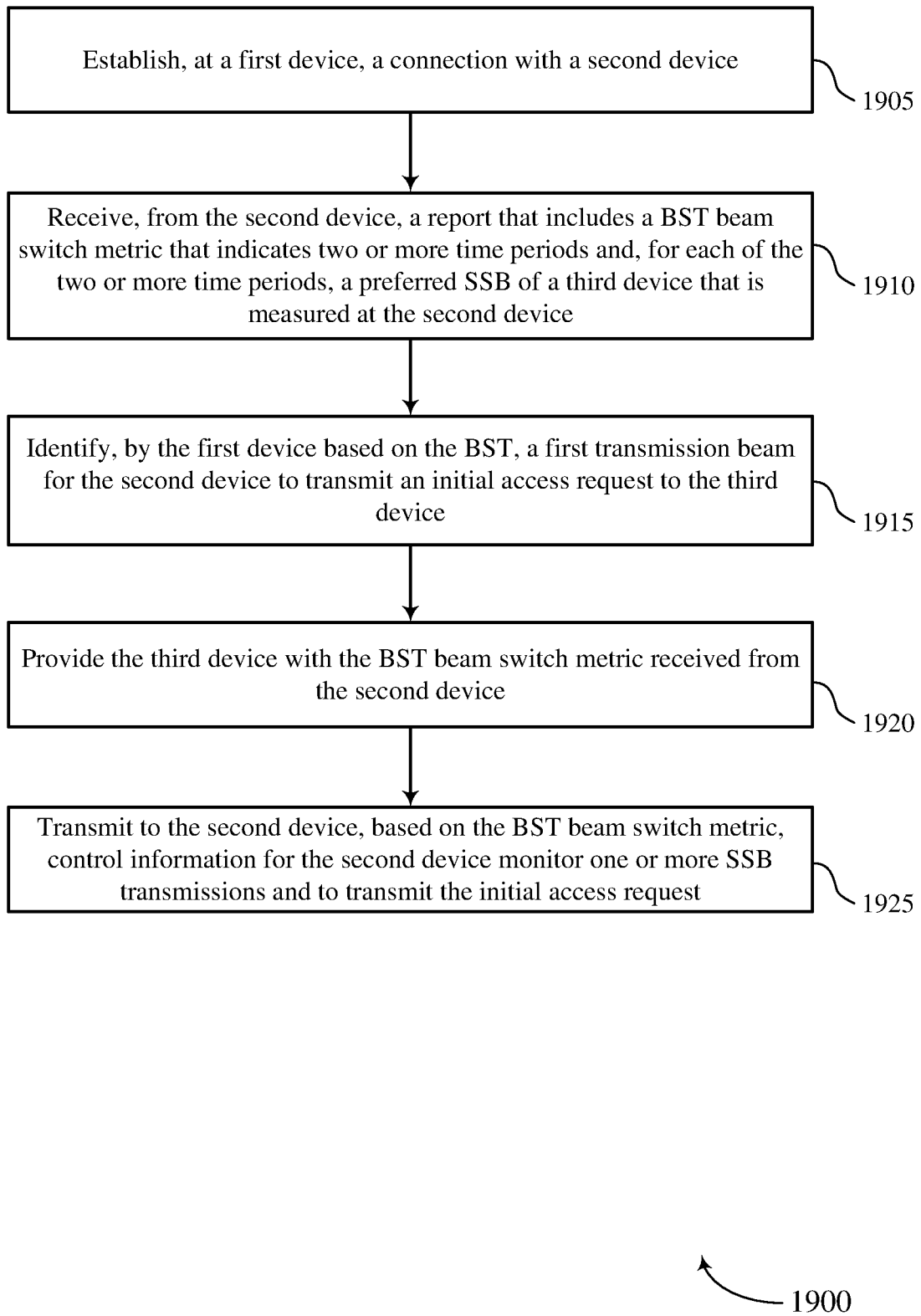

FIG. 19 shows a flowchart illustrating a method 1900 that supports beam switch related information feedback in wireless communications in accordance with aspects of the present disclosure. The operations of method 1900 may be implemented by a second device (e.g. a base station 105) or its components as described herein. For example, the operations of method 1900 may be performed by a communications manager as described with reference to FIGS. 11 through 14. In some examples, a first device may execute a set of instructions to control the functional elements of the first device to perform the functions described below. Additionally or alternatively, a first device may perform aspects of the functions described below using special-purpose hardware.

At 1905, the first device may establish a connection with a second device. The operations of 1905 may be performed according to the methods described herein. In some examples, aspects of the operations of 1905 may be performed by a connection establishment manager as described with reference to FIGS. 11 through 14.

At 1910, the first device may receive, from the second device, a report that includes a BST beam switch metric that indicates two or more time periods and, for each of the two or more time periods, a preferred SSB of a third device that is measured at the second device. The operations of 1910 may be performed according to the methods described herein. In some examples, aspects of the operations of 1910 may be performed by a report manager as described with reference to FIGS. 11 through 14.

At 1915, the first device may identify, based on the BST, a first transmission beam for the second device to transmit an initial access request to the third device. The operations of 1915 may be performed according to the methods described herein. In some examples, aspects of the operations of 1915 may be performed by a beam management component as described with reference to FIGS. 11 through 14.

At 1920, the first device may provide the third device with the BST beam switch metric received from the second device. The operations of 1920 may be performed according to the methods described herein. In some examples, aspects of the operations of 1920 may be performed by a beam management component as described with reference to FIGS. 11 through 14.

At 1925, the first device may transmit to the second device, based on the BST beam switch metric, control information for the second device monitor one or more SSB transmissions and to transmit the initial access request. The operations of 1925 may be performed according to the methods described herein. In some examples, aspects of the operations of 1925 may be performed by a secondary cell manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a memory; and
one or more processors coupled to the memory, the memory and the one or more processors being configured to:
identify a plurality of receive beams associated with a second device, each of the plurality of receive beams of the second device having a different transmission configuration indicator state and a different direction relative to the second device;
determine, based at least in part on the plurality of receive beams of the second device, one or more beam switch metrics for determining a beam switch periodicity for switching the second device between two or more of the plurality of receive beams; and
transmit a report to a first device or a third device that indicates the one or more beam switch metrics.

2. The apparatus of claim 1, wherein the first device and the third device are each base stations, and the second device is a user equipment (UE).

3. The apparatus of claim 1, wherein the one or more beam switch metrics provide information for setting beam management transmissions in accordance with the beam switch periodicity for switching the second device between the two or more of the plurality of receive beams of the second device.

4. The apparatus of claim 1, wherein the one or more beam switch metrics comprise one or more of:
a speed of the second device;
a Doppler shift of one or more transmission beams observed at the second device;
a distance between the second device and the first device;
a dwelling time that indicates an expected time duration during which a transmission beam of the first device will have more favorable channel conditions than any other of a plurality of transmission beams of the first device;
a dwelling time that indicates an expected time duration during which a receive beam of the second device will provide more favorable receive conditions than any other of the plurality of receive beams of the second device;

a second device movement profile that comprises information related to the second device movement speed and direction, spatial location changes, or combinations thereof;

a calculated beam switch periodicity; or any combinations thereof.

5. The apparatus of claim 4, wherein the beam switch metrics comprise statistics that indicate one or more of:

an average value of the associated beam switch metric;

a median value of the associated beam switch metric;

a percentile of the associated beam switch metric;

a maximum value of the associated beam switch metric during a predetermined time period;

a minimum value of the associated beam switch metric during the predetermined time period;

a histogram of observed beam switch metrics for the predetermined time period;

or any combinations thereof.

6. A method for wireless communication at a second device comprising:

identifying a plurality of receive beams associated with the second device, each of the plurality of receive beams of the second device having a different transmission configuration indicator state and a different direction relative to the second device;

determining, based at least in part on the plurality of receive beams of the second device, one or more beam switch metrics for determining a beam switch periodicity for switching the second device between two or more of the plurality of receive beams; and transmitting a report to a first device or a third device that indicates the one or more beam switch metrics.

7. The method of claim 6, wherein the first device and the third device are each base stations, and the second device is a user equipment (UE).

8. The method of claim 6, wherein the one or more beam switch metrics provide information for setting beam management transmissions in accordance with the beam switch periodicity for switching the second device between the two or more of the plurality of receive beams of the second device.

9. The method of claim 6, wherein the one or more beam switch metrics comprise one or more of:

a speed of the second device;

a Doppler shift of one or more transmission beams observed at the second device;

a distance between the second device and the first device;

a dwelling time that indicates an expected time duration during which a transmission beam of the first device will have more favorable channel conditions than any other of a plurality of transmission beams of the first device;

a dwelling time that indicates an expected time duration during which a receive beam of the second device will provide more favorable receive conditions than any other of the plurality of receive beams of the second device;

a second device movement profile that comprises information related to the second device movement speed and direction, spatial location changes, or combinations thereof;

a calculated beam switch periodicity; or any combinations thereof.

10. The method of claim 9, wherein the beam switch metrics comprise statistics that indicate one or more of:

an average value of the associated beam switch metric;

a median value of the associated beam switch metric;

a percentile of the associated beam switch metric;

a maximum value of the associated beam switch metric during a predetermined time period;

a minimum value of the associated beam switch metric during the predetermined time period;

a histogram of observed beam switch metrics for the predetermined time period;

or any combinations thereof.

* * * * *